US011161285B2

(12) United States Patent
Beard et al.

(10) Patent No.: US 11,161,285 B2
(45) Date of Patent: Nov. 2, 2021

(54) SUB-AMBIENT PRESSURE MORPHOLOGY CONTROL PROCESS FOR USE IN MOLDING EXTRUDED POLYMER FOAMS, AND PARTS PRODUCED THEREFROM

(71) Applicant: Toledo Molding & Die, Inc., Toledo, OH (US)

(72) Inventors: Brian Beard, Toledo, OH (US); Pete Ermie, Toledo, OH (US); Chris Lambert, Toledo, OH (US); Jay Myers, Toledo, OH (US); Erich Vorenkamp, Toledo, OH (US); Steve Wagener, Toledo, OH (US)

(73) Assignee: Toledo Molding & Die, Inc., Toledo, OH (US)

( * ) Notice: Subject to any disclaimer, the term of this patent is extended or adjusted under 35 U.S.C. 154(b) by 0 days.

(21) Appl. No.: 16/253,046

(22) Filed: Jan. 21, 2019

(65) Prior Publication Data
US 2019/0152099 A1 May 23, 2019

Related U.S. Application Data

(63) Continuation-in-part of application No. 14/820,813, filed on Aug. 7, 2015, now Pat. No. 10,220,549.
(Continued)

(51) Int. Cl.
*B29C 44/34* (2006.01)
*B29C 49/00* (2006.01)
(Continued)

(52) U.S. Cl.
CPC ............ *B29C 44/357* (2013.01); *B29C 44/10* (2013.01); *B29C 44/3403* (2013.01);
(Continued)

(58) Field of Classification Search
CPC ..... B29C 69/02; B29C 44/02; B29C 44/0407; B29C 44/26; B29C 44/355; B29C 49/04; B29C 49/18; B29C 49/48; B29C 49/62; B29C 49/6454; B29C 2045/0087; B29C 2045/1724; B29C 59/021; B29C 61/025; B29C 66/432; B29C 66/4326; B29C 66/51; B29C 66/53; B29C 66/83417;
(Continued)

(56) References Cited

U.S. PATENT DOCUMENTS 2,952,138 A 9/1960 Russell et al.
7,014,801 B2 3/2006 Imanari et al.
(Continued)

FOREIGN PATENT DOCUMENTS

EP 2551088 1/2013
WO WO2007008974 1/2007

*Primary Examiner* — Stella K Yi
(74) *Attorney, Agent, or Firm* — McHale & Slavin, P.A.

(57) ABSTRACT

A method of sub-ambient pressure processing of blow-molded polymer foams and skin-over-foam sandwich panel configurations for lightweight components having improved structural properties. The method can create either skinned or un-skinned foams that offer smooth interior and exterior surfaces, zero or controlled surface porosity, skins of pre-defined thickness, and foam cells that are expanded and oriented normal to the material plane, effectively spherical or polyhedral in nature, and offering improved bending and compressive strength.

17 Claims, 28 Drawing Sheets

Related U.S. Application Data

(60) Provisional application No. 62/039,607, filed on Aug. 20, 2014.

(51) Int. Cl.
| | | |
|---|---|---|
| B29C 44/10 | (2006.01) | |
| B29K 223/00 | (2006.01) | |
| B29C 44/42 | (2006.01) | |
| B29C 44/08 | (2006.01) | |
| B29C 49/04 | (2006.01) | |
| B29C 49/46 | (2006.01) | |
| B29C 49/62 | (2006.01) | |
| B29K 23/00 | (2006.01) | |
| B29K 105/04 | (2006.01) | |
| B29K 105/00 | (2006.01) | |
| B29C 49/16 | (2006.01) | |
| B29C 49/60 | (2006.01) | |
| B29K 77/00 | (2006.01) | |
| B29L 23/00 | (2006.01) | |
| B29K 21/00 | (2006.01) | |

(52) U.S. Cl.
CPC .......... *B29C 49/0005* (2013.01); *B29C 44/08* (2013.01); *B29C 44/42* (2013.01); *B29C 49/04* (2013.01); *B29C 49/46* (2013.01); *B29C 49/62* (2013.01); *B29C 2049/165* (2013.01); *B29C 2049/609* (2013.01); *B29C 2791/006* (2013.01); *B29C 2791/007* (2013.01); *B29K 2021/003* (2013.01); *B29K 2023/065* (2013.01); *B29K 2023/12* (2013.01); *B29K 2077/00* (2013.01); *B29K 2105/043* (2013.01); *B29K 2105/045* (2013.01); *B29K 2105/046* (2013.01); *B29K 2105/258* (2013.01); *B29K 2223/065* (2013.01); *B29L 2023/004* (2013.01); *B29L 2023/22* (2013.01)

(58) Field of Classification Search
CPC ........ B29C 66/83517; B29K 2105/043; B29K 2105/045; B29K 2105/046; B29L 2023/00; B29L 2023/0225; B29L 2023/225
See application file for complete search history.

(56) References Cited

U.S. PATENT DOCUMENTS

| | | |
|---|---|---|
| 7,169,338 B2 | 1/2007 | Imanari et al. |
| 8,517,059 B2 | 8/2013 | Onodera et al. |
| 8,535,598 B2 | 9/2013 | Imanari et al. |
| 2003/0021927 A1 | 1/2003 | Boenig |
| 2007/0013110 A1 | 1/2007 | Safian |
| 2007/0151799 A1* | 7/2007 | Zuberi .................... F01N 1/24 181/256 |
| 2013/0098360 A1* | 4/2013 | Hurmez ............... A61M 16/142 128/203.12 |
| 2016/0052180 A1 | 2/2016 | Beard et al. |
| 2018/0250891 A1 | 9/2018 | Beard et al. |

\* cited by examiner

SUB-AMBIENT PRESSURE MORPHOLOGY CONTROL PROCESS FOR USE IN MOLDING EXTRUDED POLYMER FOAMS, AND PARTS PRODUCED THEREFROM

PRIORITY CLAIM

In accordance with 37 C.F.R. 1.76, a claim of priority is included in an Application Data Sheet filed concurrently herewith. Accordingly, the present invention is a continuation-in-part of U.S. patent application Ser. No. 14/820,813 entitled "SUB-AMBIENT PRESSURE MORPHOLOGY CONTROL PROCESS FOR USE IN MOLDING EXTRUDED POLYMER FOAMS, AND PARTS PRODUCED THEREFROM" filed Aug. 7, 2015 which further claims priority to U.S. Provisional Patent Application No. 62/039,607 entitled "SUB-ATMOSPHERIC PROCESS FOR USE IN BLOW MOLDING FOAM" filed Aug. 20, 2014. The contents of the above referenced application are incorporated herein by reference.

FIELD OF THE INVENTION

This invention relates to the field of molding extruded polymer foams and, in particular, to a method of blow molding using a sub-ambient pressure process that improves both the foam cell morphology and structural properties of a part's walls by imposing specific pressure and thermal boundary conditions after the basic part shape is formed. In particular, the exposure of the foamed resin part shape to a carefully controlled regime of pressures, including down to extreme sub-ambient pressures, in combination with specifically imposed and regulated thermal boundary conditions, can dramatically alter the cell structure throughout the part and thereby offer multiple process and performance advantages.

BACKGROUND OF THE INVENTION

The current state of the art for foam blow molding consists of using chemical or physical foaming additives, resin pellets pre-impregnated with a gas, or gas introduced into the extruder or elsewhere in the extrusion system with a compatible resin and suitable nucleating agent, if required. Combinations of two or more of the above means by which blowing or foaming gas is introduced, including a mix of gases, is now commonly employed to achieve improved performance. By whatever approach is employed, the desired outcome is to create a single-phase fluid that is homogeneous while under the temperature and pressure conditions within the extrusion system. Upon exiting the extrusion system into the ambient environment at the die tip, the sudden drop in fluid pressure results in the gas coming out of solution from the once single-phase polymer melt and forming gas-filled cells at nucleation sites established at discontinuities inherent to the polymer blend or to those presented by the dispersed nucleating agent. The cells will ideally grow spherically and remain individual, yet numerous, as the extruded parison is manipulated and formed into its ultimate shape. This process is very dynamic, enduring extensional forces, continuously changing nonlinear material property changes, temperature and pressure gradients, varying diffusivity and solubility of the gas within the polymer, inter-cellular pressures, cell coalescence and destruction, etc. Generally, polymers or polymer blends must be employed which exhibit specific combinations of melt index, melt tension, strain hardening, etc., in order to be properly extruded, foamed, and made to conform properly to a pre-defined part shape. The process of manipulating, stretching, and blowing even very low pressure air, relative to ambient atmospheric pressure, into the parison to form the parison onto the mold cavity inherently flattens and elongates the cell structure away from their more ideal spherical or polyhedral shapes.

The state of the art in blow molding of foam is to supply enough gas to the polymer to create sufficient foam at the die tip to survive the transition from extruded parison to formed article, while retaining the maximum number of discrete foam cells so as to maintain the desired cellular structure and low product density. Due to changes in pressure, diffusivity and solubility of the gas in the resin as it cools, some cells will simply shrink in volume and even disappear as the gas may be reabsorbed into the resin during cooling and subsequent application of forming pressure. In general, internal cell pressures are reduced, causing the cells to shrink and buckle during part formation and cooling. As the parison is expanded to reach the walls of the mold, the cells tend to become flattened and elongated parallel with the surface of the part which, on a local basis, is referred to as the material plane. With the application of forming pressure to impose definition to the part, these flattened cells can become even more flattened. Generally, a fine balance between gas content, resin system, extrusion die geometry, extrudate temperature and extrusion rate, ambient air and mold temperatures, forming pressure, and time are used to maintain the conditions to ensure maximum residual foam cell volume. In general practice, the foamed resin must be treated very gently in order to maintain the foam's integrity throughout the process. The final part tends to be populated with generally flattened cells, many with collapsed cell walls. These cells, being slightly compressed and collapsed by forming pressure, intercellular pressure reduction, and cooling related material shrinkage, tend to have a flattened and buckled shape that is aligned generally parallel to the material plane. Such foamed structures tend to have poor material properties both in bending and normal to the material plane. If conditions are not carefully maintained many cells may collapse or rupture, creating open-celled foams that can result in surfaces that are excessively rough and/or porous.

U.S. Pat. No. 8,517,059 assigned to Kyoraku discloses a blow molding foam process but fails to disclose a sub-ambient pressure process of using internal vacuum and specific mold thermal boundary conditions to expand and manipulate the structure of the foamed part walls after the part is formed into its final shape and while still in a molten or semi-molten state.

U.S. Pat. No. 7,169,338 assigned to JSP discloses a method for blow molding polyethylene foams using physical foaming agents that also specifies drawing the air from the interior of the formed part for the purpose of allowing two opposing walls in close proximity to fuse together internally without trapped air pockets. This patent fails to make any mention of using internal vacuum in any way to modify or control the foam structure nor is there any mention of either spherical cells or variable density structures.

U.S. Pat. No. 8,535,598 discloses a method for producing low density polypropylene foams in which the statement is made that chemical foaming agents are insufficient to reduce densities to below 0.7 g/cm3, which relates to an expansion ratio of 1.29 times, and which is consistent with all known information prior to this invention. This patent also discloses a limitation of maximum part width to die diameter ratio of 1.5 times.

U.S. Pat. No. 7,014,801 entitled "Polypropylene Resin Hollow Molded Foam Article and a Process for the Production Thereof" describes a scheme for selecting and blending various propylene resins of differing properties to yield a range of foamable base resins for use with physical foaming with carbon dioxide gas. Also disclosed is a potentially multi-layered, foamed, hollow article made by co-extruding discrete layers into a single parison. No mention is made of manipulating the foam structure to create expanded cells, nor is there any mention of creating a multilayered structure from a homogeneous monolayer extruded parison.

What is disclosed is a method of blow molding using a sub-ambient pressure process providing parts with smooth interior surfaces that are as smooth as, or smoother than, most current production non-foamed or foamed parts.

SUMMARY OF THE INVENTION

Disclosed is a method of sub-ambient processing of blow-molded polymer foams and density gradient induced skin-over-foam sandwich panel configurations for light-weight components having improved structural properties. The method is used to create blow-molded articles comprised of polymers and foamed by the action of either chemical or physical foaming methods. This process can create either skinned or un-skinned foams that offer smooth interior and exterior surfaces, zero or controlled surface porosity such as caused by cell wall rupturing, skins of pre-defined thickness, and foam cells that are expanded and possibly oriented normal to the material plane, effectively spherical or polyhedral in nature, reducing density, and offering improved bending and in-plane compressive strength.

A distinction is made herein to define ambient conditions as those into which a foamed parison is extruded at the die tip, which may not be purely atmospheric in nature. The terms sub-ambient, or otherwise known as vacuum or negative pressure, are held to be relative to said ambient conditions. Positive or super-ambient pressures are similarly regarded as relative to these same ambient conditions.

Foam densities may vary depending upon what material systems are used in their composition. Generally, in order to compare simply on the basis of foam content, expansion ratios are generally used and are defined herein as the ratio of the un-foamed resin's density divided by the foamed resin's density. For example, if a foam sample if expanded to half of its un-foamed density, then the expansion ratio would be exactly 2 and would commonly be referred to as having an expansion ratio of 2 times.

An objective of the instant invention is to provide a blow molding process that reduces or eliminates foam cell collapse due to in-mold pressurization, intra-cellular pressure decay, and forming induced cell elongation and collapse.

Another objective of the invention is to provide a sub-ambient pressure blow molding process that is capable of achieving expansion ratios far exceeding the capabilities of the same blow molding process not employing the process.

Still another objective of the invention is to provide a blow molding process that achieves excellent foam densities on prior foamed, or otherwise sufficiently gas laden, resin with no added foaming agents.

Another objective of the invention is to provide a blow molding process that can reduce foaming additive usage by 50% or more, resulting in improved control over foam expansion at the die tip, improved rheological, elongational, and resulting formability properties of the resin system. This allows for more difficult geometries to be formed since the foam is expanded to the desired reduced density after, instead of before, the basic part shape has been formed.

Still another objective of the invention is to provide a sub-ambient pressure blow molding process that can reduce or eliminate the need for the addition of expensive or otherwise problematic material enhancements such as long chain branching, cross linking, co-polymers, rubber-phase additives, nanoclays, and the like.

Another objective of the invention is to provide a blow molding process that elongates and pre-stresses the polymer cell walls both in general and more specifically normal to the material plane, thus imposing significant improvements in stiffness.

Another objective of the invention is to provide a blow molding process that teaches the elongation and alignment of the polymer and orients mineral or other fiber or plate-like micro-reinforcement or nano-reinforcements for optimal reinforcement.

Yet still another objective of the invention is to provide a teaching wherein process temperatures, stage timing, parison thickness, and vacuum and pressure levels can be used to achieve an ideal cellular structure and skin thicknesses from film thin to millimeter scale. A significantly open-celled structure is also possible when specific conditions of material properties, resin temperature, internal pressure, and exposure time are implemented. Significantly open celled structures can be selectively formed on inner surfaces, outer surfaces, within the core of the wall, or a combination thereof. Open celled structures can be beneficial for acoustical properties in certain instances.

Another objective of the invention is to provide a blow molding process that can produce interior surfaces that are extremely smooth and suitable for efficient fluid handling; which is accomplished by forming and managing internal skins through the implementation of this process.

Yet still another objective of the invention is to provide a wall with a controllable density gradient throughout its thickness, effectively offering a sandwich structure with layers of differing properties to impose varying speeds of sound from a skinned surface, through the foamed core, to the opposite skin face; creating a series of impedance mismatches. Such structures are useful for their acoustical properties.

Another objective of the invention is to provide a blow molding process comprising a skin-over-foam sandwich panel like structure capable of providing superior structural performance vs. simply foamed or solid materials.

Another objective of the invention is to provide a blow molding process that can dramatically expand a polymer foam system, offering superior thermal insulation properties.

Another objective of the invention is to provide a blow molding process that allows for additional localized foam expansion with local application of heat through the mold, for example, an extra thick foam pad, such as could be used for insulating, isolating, or sealing purposes, could be formed in place by spot-heating or, in a more limited approach, insulating a specific area of the mold during the foam expansion stage.

Still another objective of the invention is to improve parting lines, frequently known as pinch-offs, by means of the expanding cellular resin moving inwardly to compete for space as the volume increases inwardly while the surface area of the inner surface decreases, causing increased polymer chain entanglement at the interface as the two fronts converge.

Yet still another objective of the invention is to provide a blow molding process that can work on commonly available process equipment employing a single extruder, such as with a monolayer blow molding system, co-extrusion blow molding systems, in-line single- or multi-sheet extrusion and molding systems, single or multi-sheet thermoforming, compression molding, suction blow molding, and the like.

Yet still another objective of the invention is to create a foam structure with auxetic, or negative Poisson's ratio, properties due to properly staged expansion and re-compression of the foam as it cools. Auxetic foams can offer acoustical and vibrational benefits by altering the dynamic response behavior of the resulting structure.

Yet still another objective of the invention is to nucleate new cells or regenerate collapsed cells or those that initially failed due to sub-critical pressure and volume conditions upon, or shortly after, exiting the die tip from still molten, gas laden resin after the part has formed, thus permitting additional density reductions without suffering an excessively foamed parison and the processing problems typically experienced therefrom.

Advantages of the invention include generally highly expanded, spherical or polyhedral cell structure in planes perpendicular to the wall thickness comprising at least 10% of the wall thickness, up to over 100%; Blow molded polyolefins and polyolefin blends with spherical cell structure; Blow molded foams of a non-polyolefin nature with spherical cell structure; Wall structure with variable average density of 1.1:1 to 4:1 between adjacent layers; effectively creating functional skin layers from a single extruded layer; significant open cell structure in the core with closed cell structures toward each surface; significant open cell inner layer on the inside layer, with closed cells on the outer layer with the inner layer either open or closed; Core layer comprising cell structure with auxetic properties; Both the inner and core layer comprising cell structure with auxetic properties; Structure with variable expansion ratios ranging from 1.1 to 4 times in different areas of the formed part; A process for morphing the cell structure of a formed part to impart improved cell structure and structural properties using thermal and pressure controls, including sub-ambient pressures.

The process allows for the forming of structures containing highly expanded spherical or polyhedral cells in blow molding or in-line extruded sheet forming. A process for producing a variable density foam product with distinctly differing functional layers from a single layer extrusion system; A process for improving expansion ratios for chemical foaming agents from typical 1.33 maximum to between 1.33 and 2 times; A process for improving expansion ratios for chemical foaming agents from typical 1.33 maximum to between 2 and 4 times; A process for producing significantly open celled foams between layers of closed cell foams; A process for producing significantly open celled foams on the inside layer with closed cell foams on the outside layer; A process for creating structures with auxetic properties utilizing blow molding or the like.

Other objectives and further advantages and benefits associated with this invention will be apparent to those skilled in the art from the description, examples and claims which follow.

DETAILED DESCRIPTION OF THE PREFERRED EMBODIMENT

Figure 1:
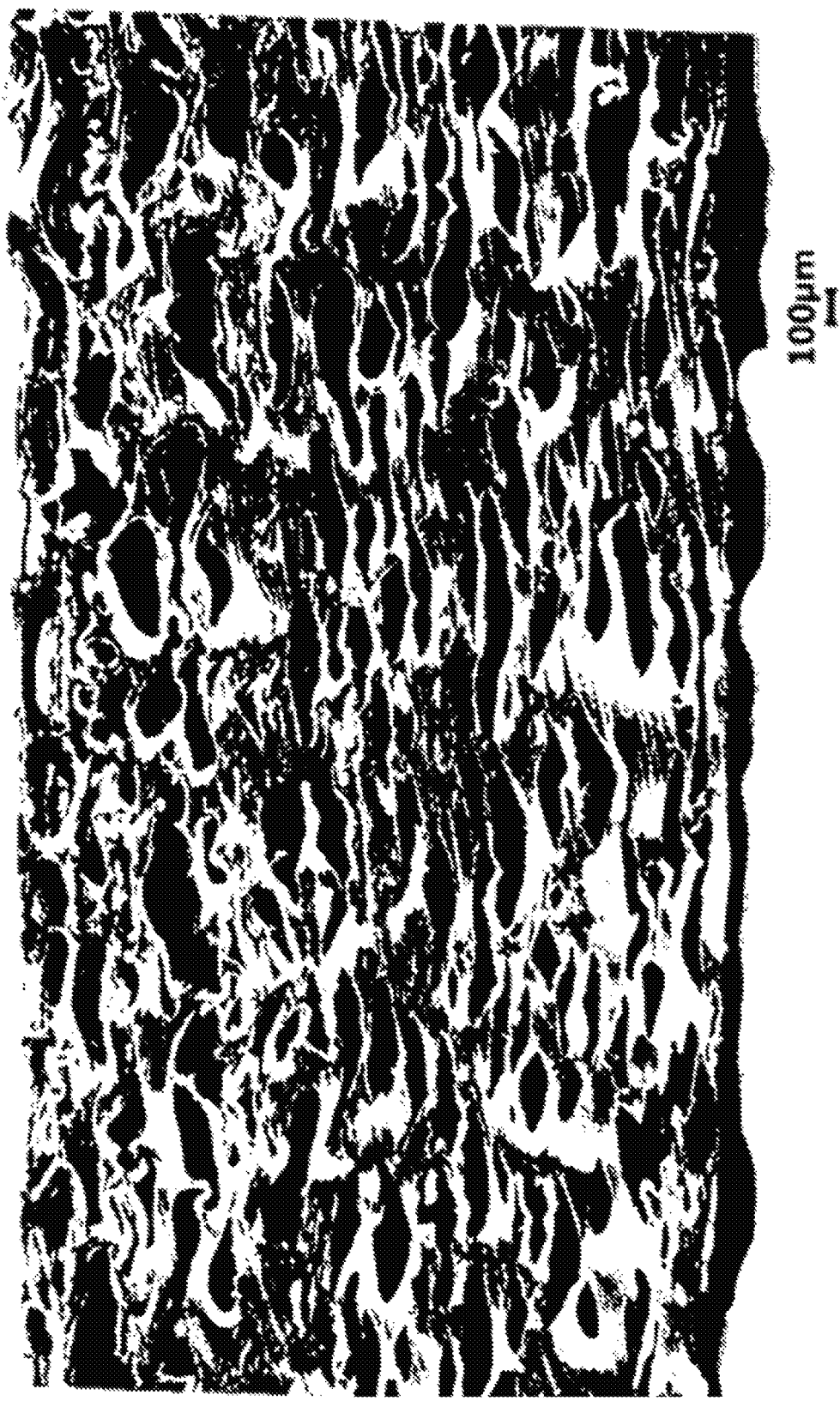
FIG. 1 is an enlarged photograph of a cross section of a flattened cell structure of a prior art product made from a blow molded foam technology featuring a proprietary, improved resin system, with an expansion ratio of 1.76 times and 2.1 mm thickness.

A detailed embodiment of the instant invention is disclosed herein, however, it is to be understood that the disclosed embodiment is merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Sub-ambient pressure processing of blow-molded polymer foams and skin-over-foam sandwich panel configurations for lightweight components with improved structural properties. A sub-ambient pressure processing method has been developed that provides a highly configurable method for creating blow-molded articles comprised of polymers and foamed by the action of either chemical or physical foaming methods. This process can create either skinned or un-skinned foams that offer smooth interior and exterior surfaces, zero or controlled surface porosity, skins of pre-defined thickness, and foam cells that are expanded and oriented normal to the material plane relative to their initial flattened state, effectively spherical in nature, and offering improved bending, and compressive strength. The current development is focused on hollow members such as automotive HVAC ducting, but could easily extend to air induction ducting, underbody shielding, and other blow-moldable polymer products.

The inventive process proposed herein differs from conventional foam blow molding processes in that it employs a pressure-vacuum cycle to first form the basic shape of the part, then expanding the hitherto flattened foam cells in the still molten material wall into generally spherical or polyhedral cells or cells that are elongated normal to the material plane. As the foam solidifies under internally expansive forces, under tension, the normally disposed cell walls are pre-strained and solidified in an expanded, maximum volume state rather than buckled, offering significant stiffening of the structure as well as expansion of the collective cellular volume of the part, significantly lowering the density of the part. The process is variable and can be used to specifically tailor the properties of the cellular foam and can create a solid outer skin on both inner and outer surfaces of the part, thus providing a sandwich panel with smooth, nonporous walls, and offering the superior structural properties commonly associated with foam-cored sandwich panels.

Specifically, this process offers the following advances over current technology:

A) Sub-ambient pressure processing reverses the trend of foam cell collapse due to in-mold pressurization, intra-cellular pressure decay, and forming induced cell elongation. It enables the re-expansion of cells from partially to completely, with subsequent volume inflation of existing cells, and creation of new cells as remaining gas-laden polymer strives to reach equilibrium with the newly imposed environment; thus reducing part density far beyond conventional approaches. Expansion ratios of up to 3 times have been observed with this process employed on resin and chemical foaming systems known to achieve expansion ratios of barely 1.37 under standard HDPE blow molding practices—with no externally applied internal blow pressures after the mold halves have closed. Positive internal blow pressures of any magnitude are known to further reduce achievable expansion ratios.

B) With appropriate nucleating agents, this process has been observed to achieve excellent foam densities on prior foamed regrind with no added chemical foaming agents. Very small additional chemical or physical foaming agents in such systems yields impressive foam expansion with this system when appropriate cell nucleation conditions or additives are present.

C) The system, developed initially for polyolefins such as HDPE and PP, can be used with many polymer types and blends, foaming agents, cell nucleators, and reinforcements; each offering specialized properties.

D) Allows the minimal use of foaming additives since foam cells are maximized with the process rather than degraded. This can reduce foaming additive usage by 50% or more.

E) Lower foaming additive amounts, resulting in lower initial extruded cell volume, improves the material properties and formability of the resin system, and preserving the predominantly closed-cell nature of the foam, thus allowing for more difficult geometries to be formed, since the foam will be expanded after the part is formed.

F) Owing to the expanded processing window afforded by sub-ambient pressure processing of standard resins, the approach can offset, or eliminate entirely, the need for exotic, expensive, or problematic material enhancements, such as long chain branching, cross linking, co-polymers, rubber-phase additives, nanoclays, etc.

G) Elongates and pre-stresses the polymer cell walls both generally and specifically normal to the material plane, thus imposing significant improvements in stiffness. This elongation and alignment of the polymer also preferentially orients mineral or other micro- or nano-reinforcements for optimal reinforcement.

H) Many varying implementations of either locally applied or whole-part rapid mold heating and cooling technologies can be applied to this process to impose the thermal boundary conditions needed by this process for both foam structure manipulation and optimal cooling for reduced cycle times. Such methods include, but are not limited to induction, steam, oil, electric heater cartridges, infrared, internal hot gas injection, etc.

I) Process temperatures, stage timing, parison thickness, and vacuum and pressure levels can be used to achieve both the ideal cellular structure and the presence and thickness of the skins on either or both material faces. Skin thicknesses from film thin to millimeter scale are possible. Open-celled and auxetic cellular structures are also possible with exposure to properly staged in-mold sub- and super-ambient pressure conditions.

J) The process, owing to the possibility of forming skins, can produce interior surfaces of extremely smooth nature.

This is important for efficient fluid handling.

K) The process can be configured to produce a foam density gradient normal to the material plane, by virtue of temperature control, stage timing, and pressure-vacuum levels employed. The foam structure has a density gradient variation of up to about 200 percent between adjoining layers of inner third, core third, and outer third.

L) The sandwich structure imposes varying speeds of sound from a skinned surface, through the foamed core, to the opposite skin face; creating a series of impedance mismatches. This is beneficial for acoustic and structural vibration performance.

M) The skinned foam core comprises a sandwich panel which is known to offer superior weight-normalized structural performance vs. simply foamed or solid materials.

N) The process can dramatically expand a polymer foam system, offering superior thermal insulation properties.

O) The process allows for localized foam expansion with local application of heat through the mold, for example, an extra thick foam pad could be formed in place by spot-heating, or selectively insulating against polymer-mold heat transfer, a specific area of the mold during the foam expansion stage.

P) Parting lines, frequently known as pinch-offs in blow-molding terminology, tend to be reinforced as the foam is expanded volumetrically into the interior of the part cavity. As the resin moves inward, it competes for space as the internal surface area decreases, causing increased polymer chain entanglement at the interface as the two fronts converge and intermingle.

Q) This process, although developed initially on a single extruder, monolayer blow molding system, will work with co-extrusion blow molding systems as well as with single or multi-sheet thermoforming, direct extruded sheet forming, and compression molding.

FIG. 1 is an enlarged photograph of a flattened cell structure using an existing blow molded foam technology referred to by U.S. Pat. Nos. 8,517,059 and 8,535,589 and which reveals an expansion ratio of 1.76 times and 2.1 mm thickness.

Figure 2:
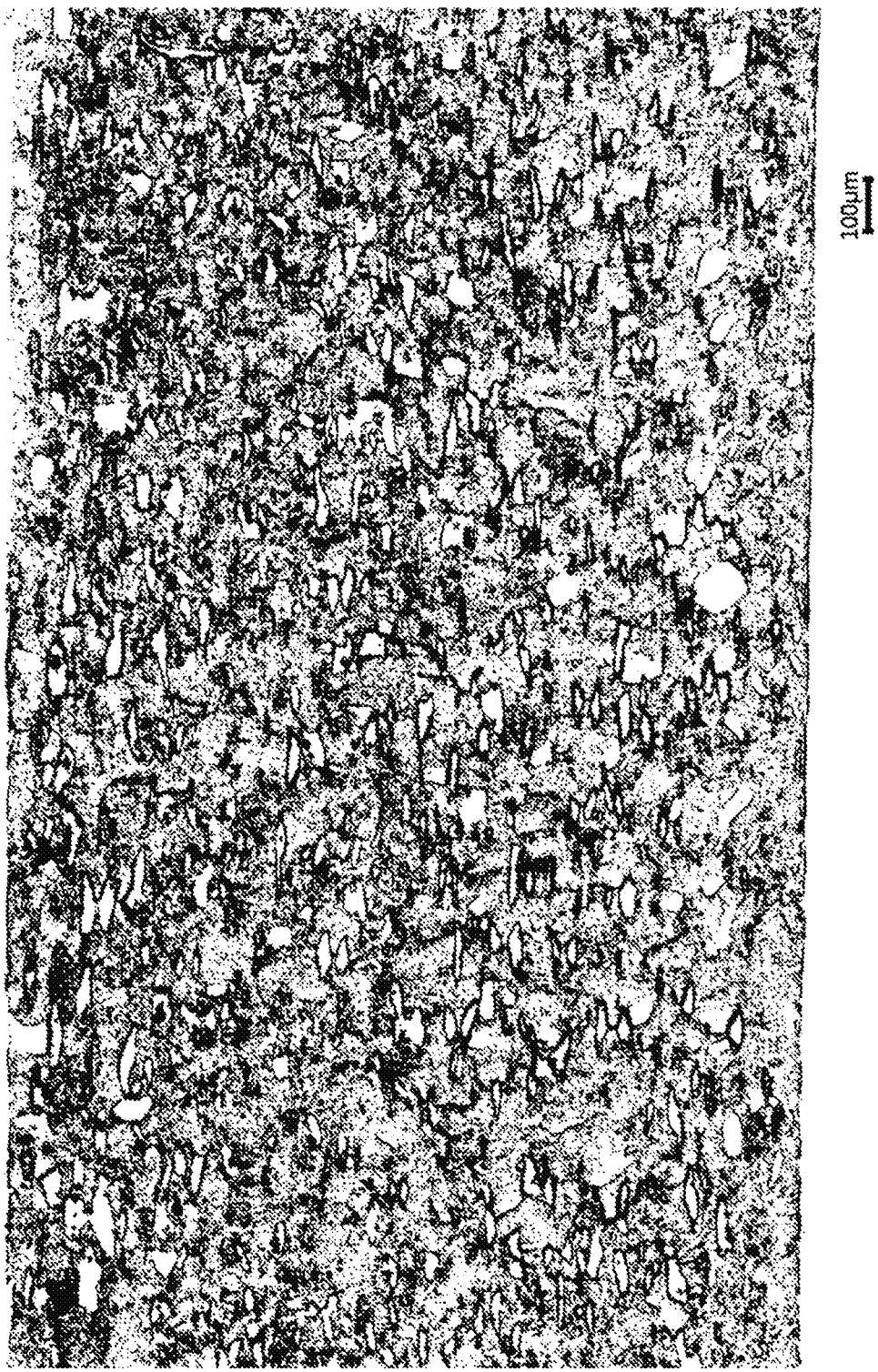
FIG. 2 is an enlarged photograph of a cross section of a product made from current non-enhanced HDPE resin and commercially available chemical foaming system under conventional blow molding conditions, without sub-ambient pressure processing, and having an expansion ratio of 1.3 times and a 1.6 mm thickness.

FIG. 2 is an enlarged photograph of a product made from current resin and chemical foaming system under conventional blow molding, without sub-ambient pressure processing, and having an expansion ratio of 1.3 times and a 1.6 mm thickness. This is similar to what conventional blow molded foam structures would resemble, with flattened and largely collapsed cells.

Figure 3:
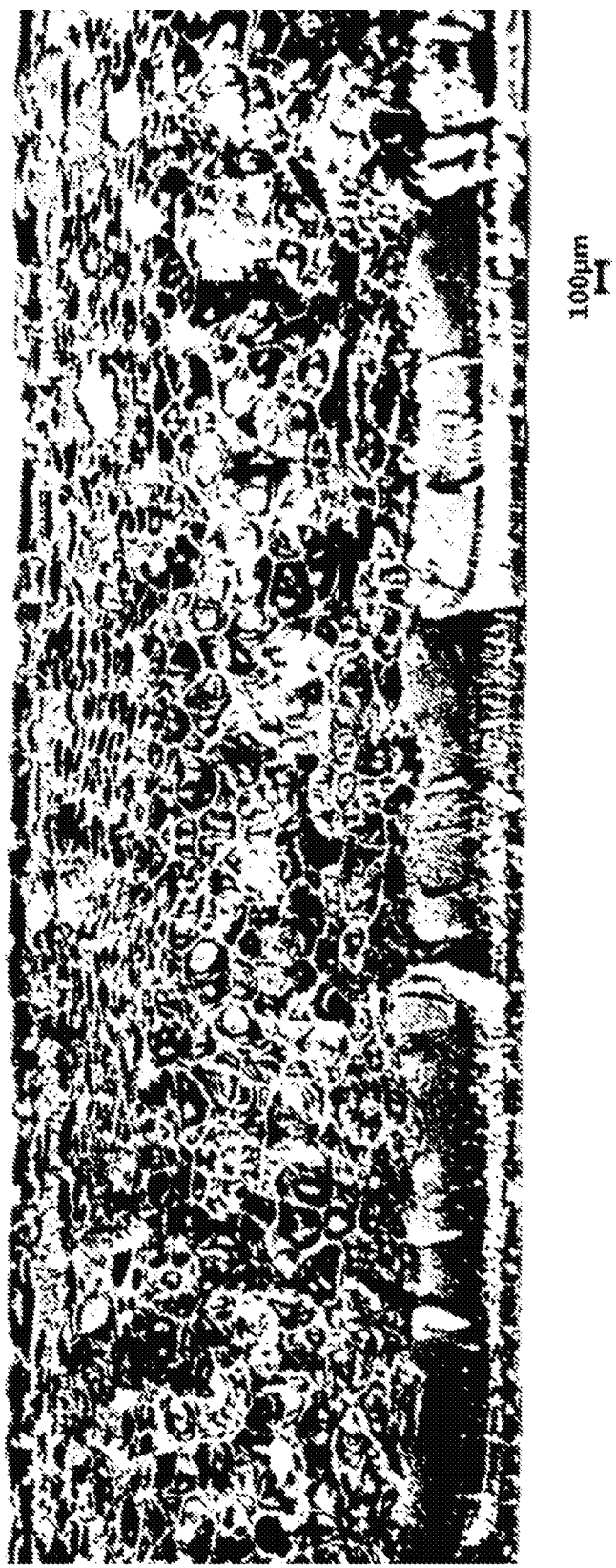
FIG. 3 is an enlarged photograph of a cross section of a product made from the instant invention blow molding foam technology using a thick internal film forming variant of the sub-ambient pressure process, yielding an expansion ratio of 1.68 times and at a 1.7 mm thickness.

FIG. 3 is an enlarged photograph of a product made from the instant invention, blow molded foam technology using a thick internal film forming variant of the sub-ambient pressure process, yielding an expansion ratio of 1.68 times and at a 1.7 mm thickness. Notably, a thin skin is formed on one surface and a thick skin is formed on the other, with a steep foam density gradient being formed from each surface to center of the wall's thickness.

Figure 4:
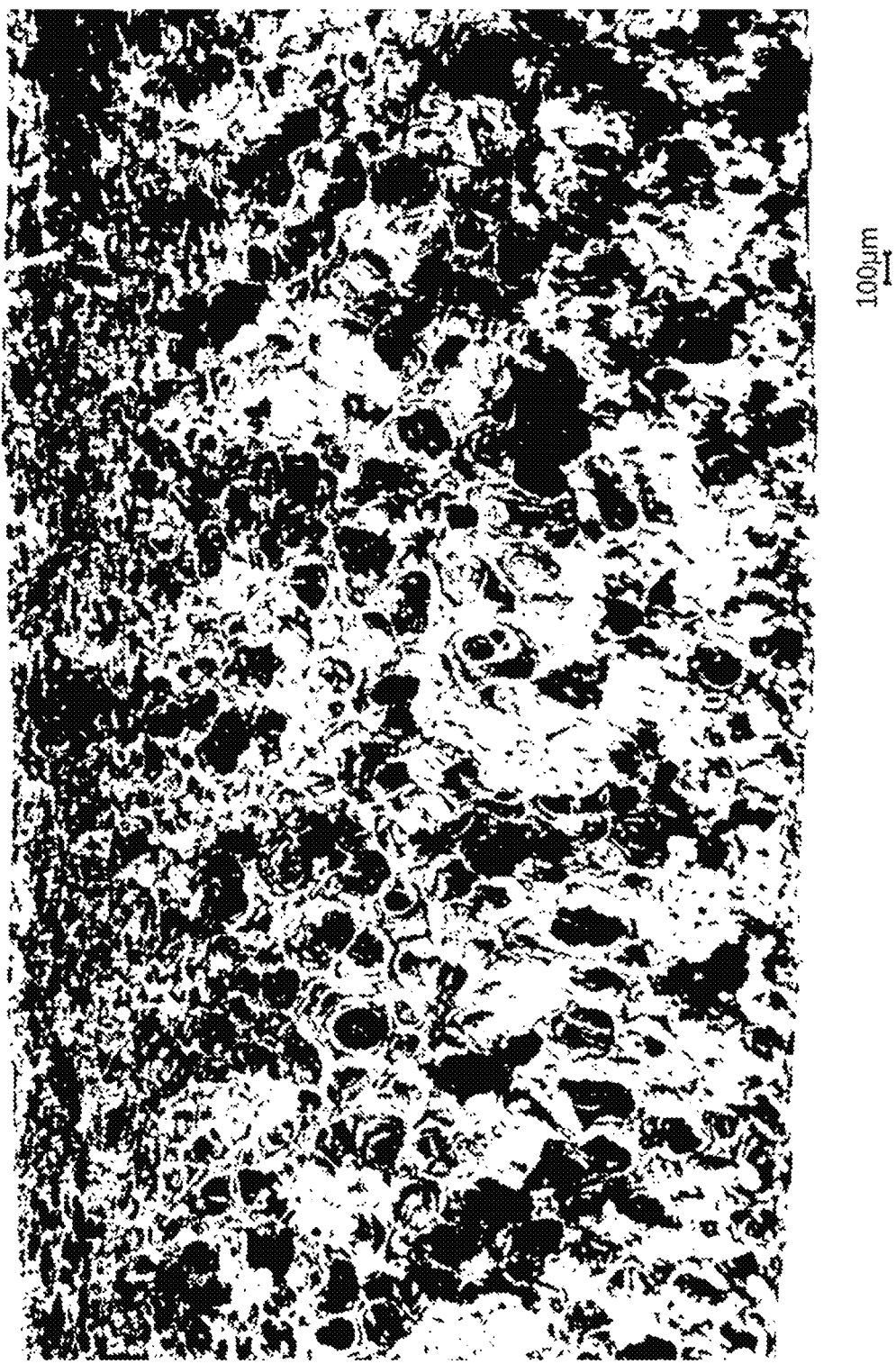
FIG. 4 is an enlarged photograph of a cross section of a product made from the instant invention blow molding foam technology using a minimal film forming variant of the sub-ambient pressure process yielding an expansion ratio of 2.67 times with a 2.5 mm thickness.
Figure 5:
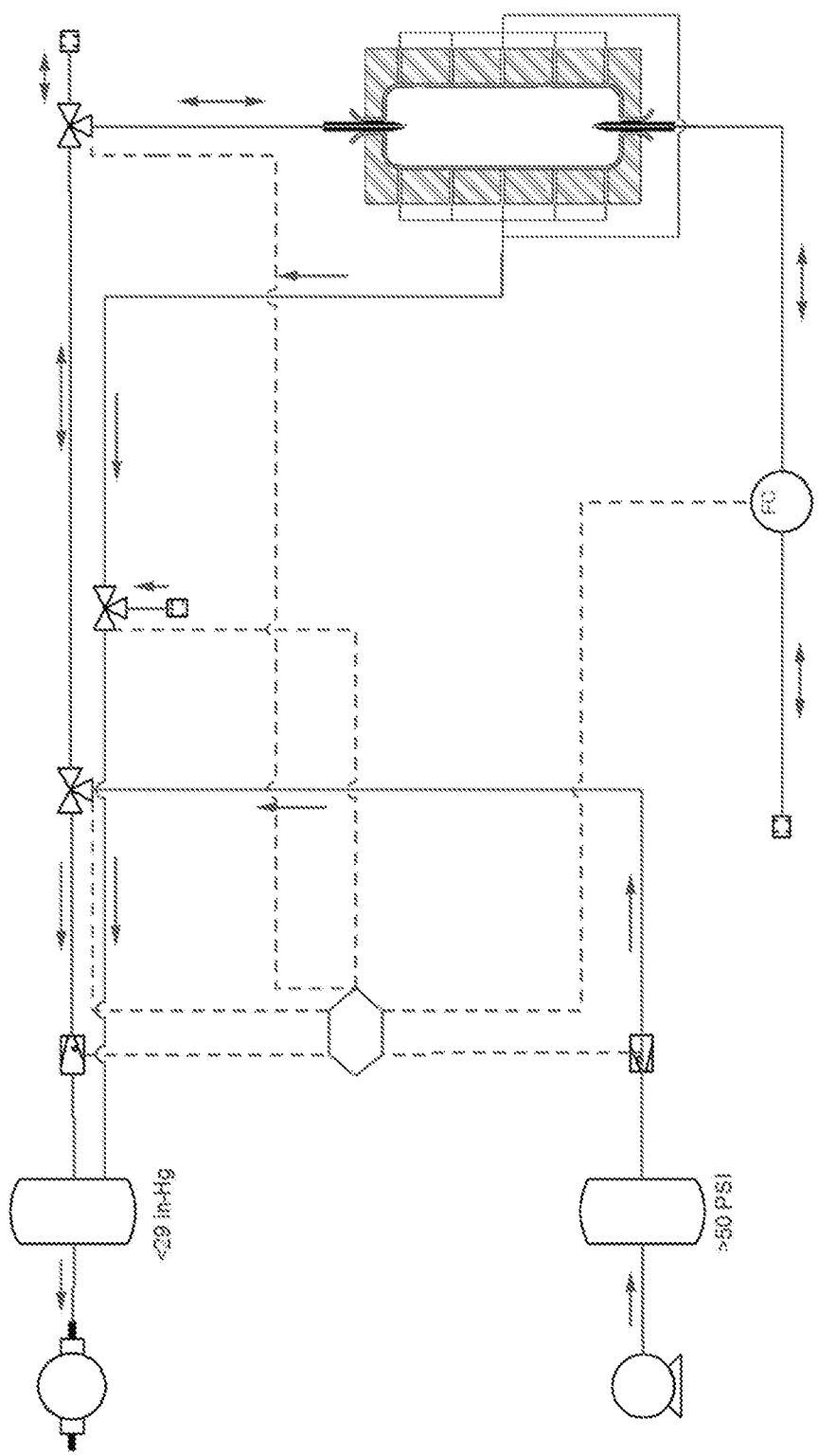
FIG. 5 is a process flow diagram of the preferred embodiment with dual pin/needle flow-through cooling.

FIG. 4 is an enlarged photograph of a product made from the instant invention blow molded foam technology using a minimal film forming variant of the sub-ambient pressure process yielding an expansion ratio of 2.67 times with a 2.5 mm thickness. Note the smooth skins on both top and bottom surfaces over a highly expanded foam core;

FIG. 5 is a process flow diagram of the preferred embodiment with dual blow pin/needle arrangement allowing for regulated, flow-through cooling. Also depicted are the connections for computer programmable operation of valves and regulators to impose the necessary process conditions.

Figure 6:
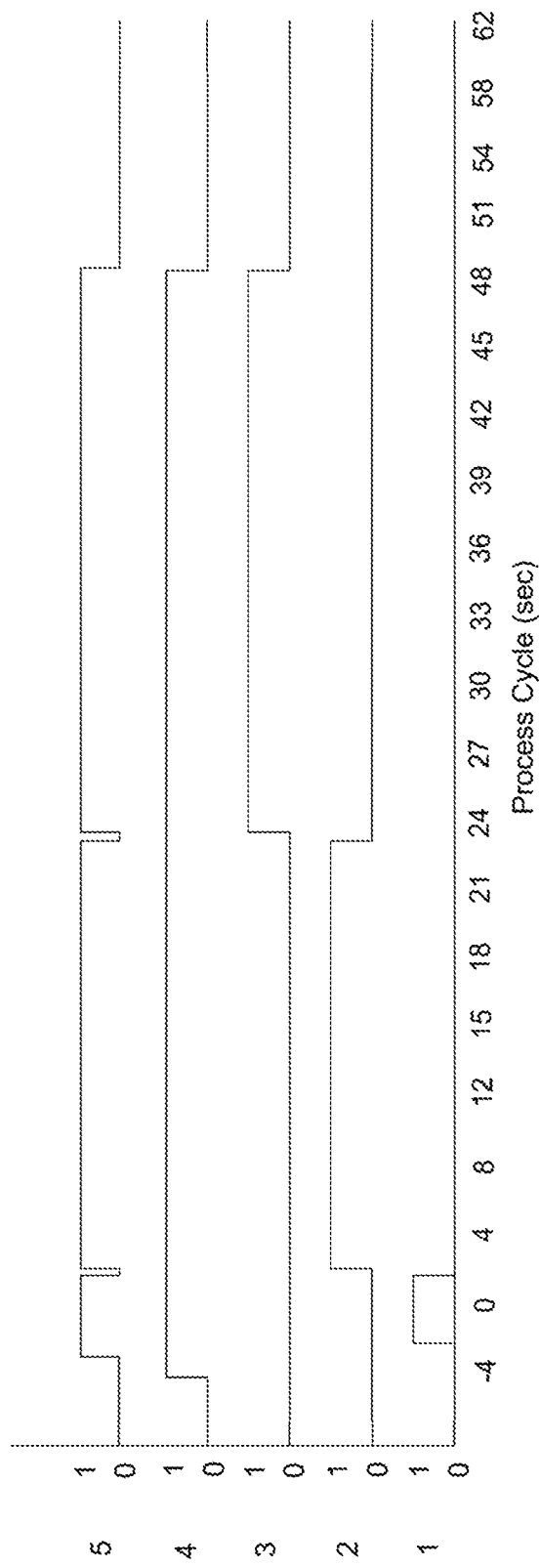
FIG. 6 is a state chart of the process cycles and timing used to implement the basic sub-ambient pressure process.
Figure 7:
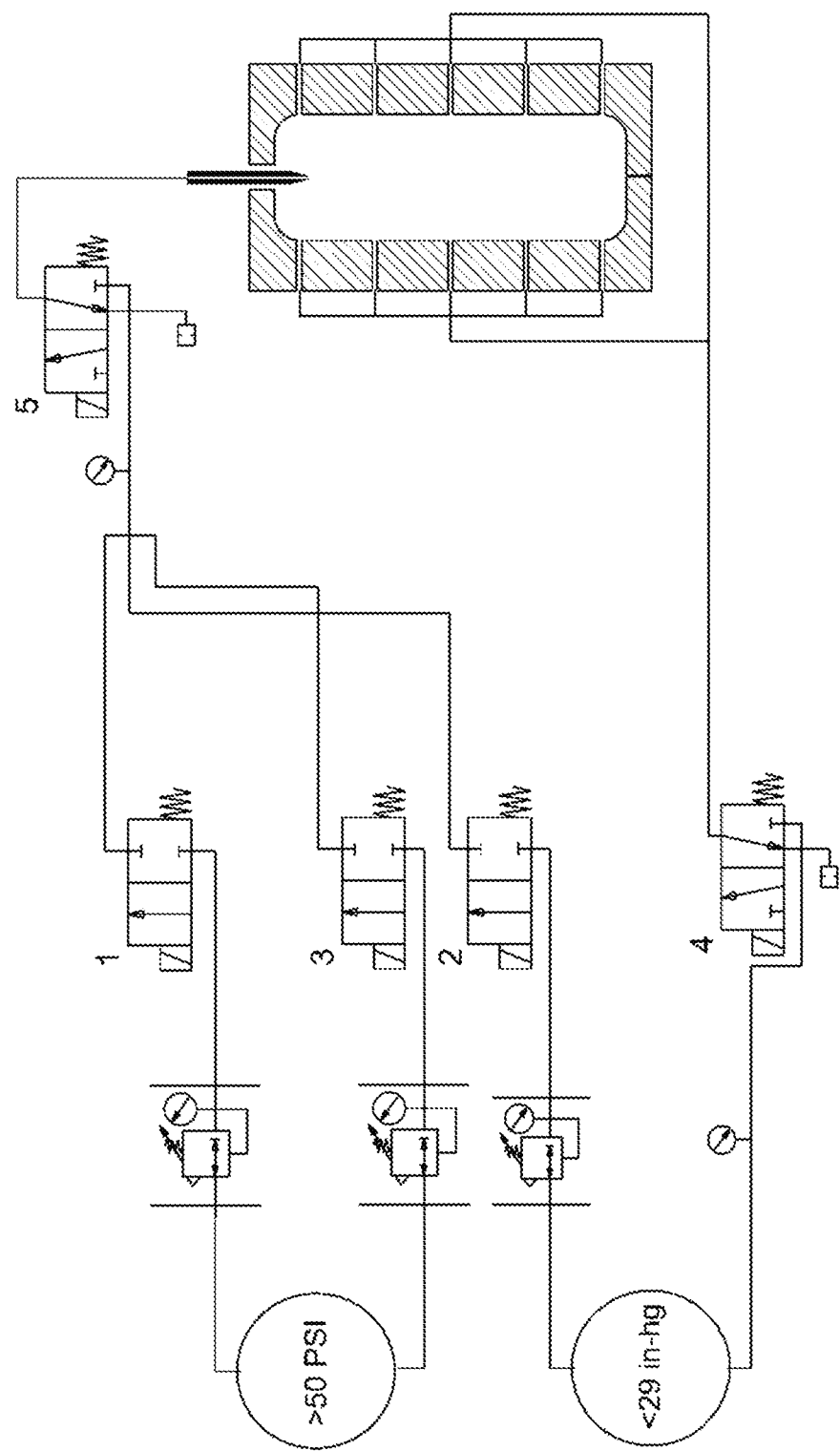
FIG. 7 is a schematic of the simplest and most basic form of sub-ambient pressure cycling apparatus annotated to refer to control elements in FIG. 6.
Figure 8:
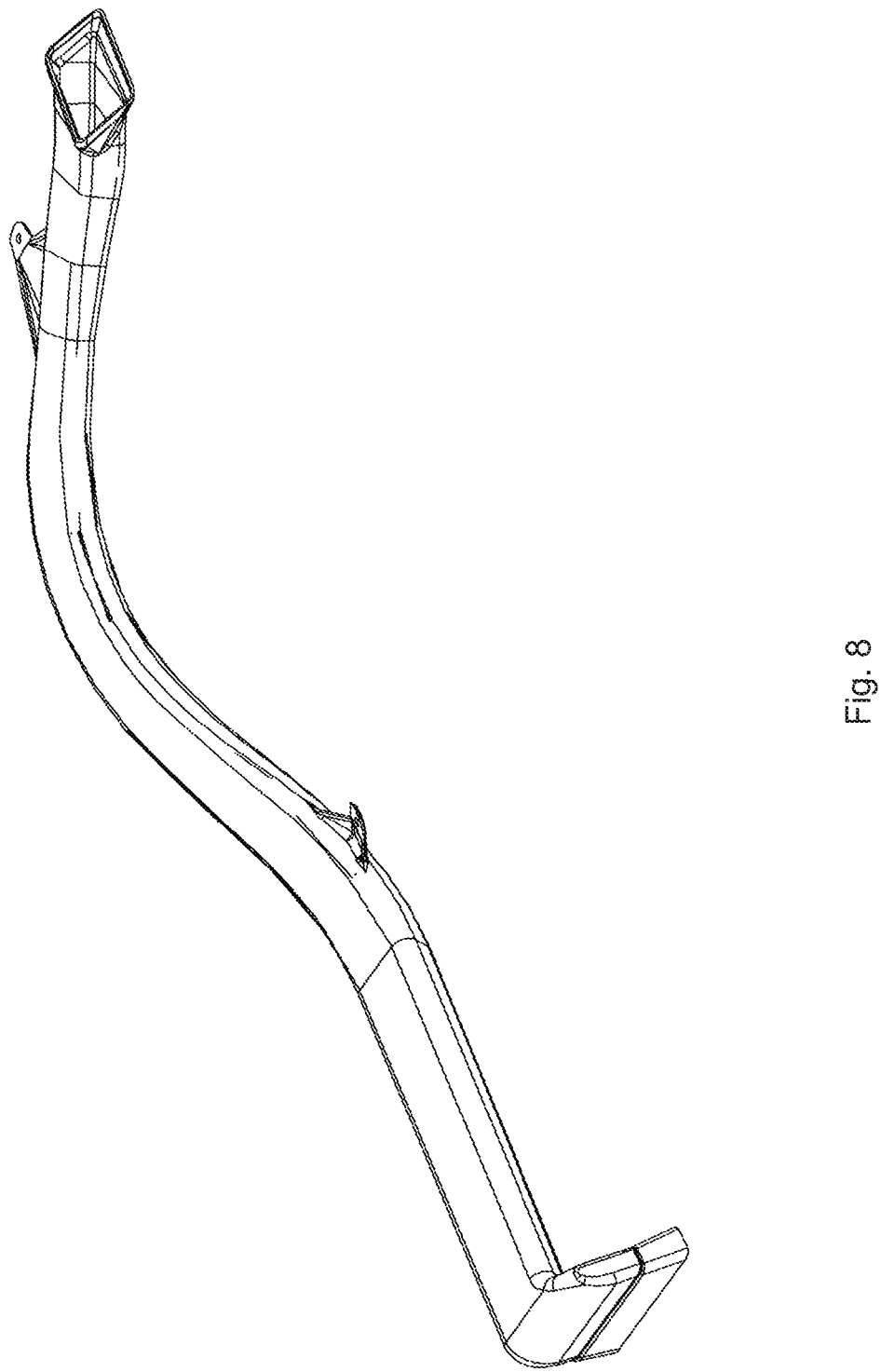
FIG. 8 is a drawing of the right hand demister duct formed from the present blow mold.
Figure 9:
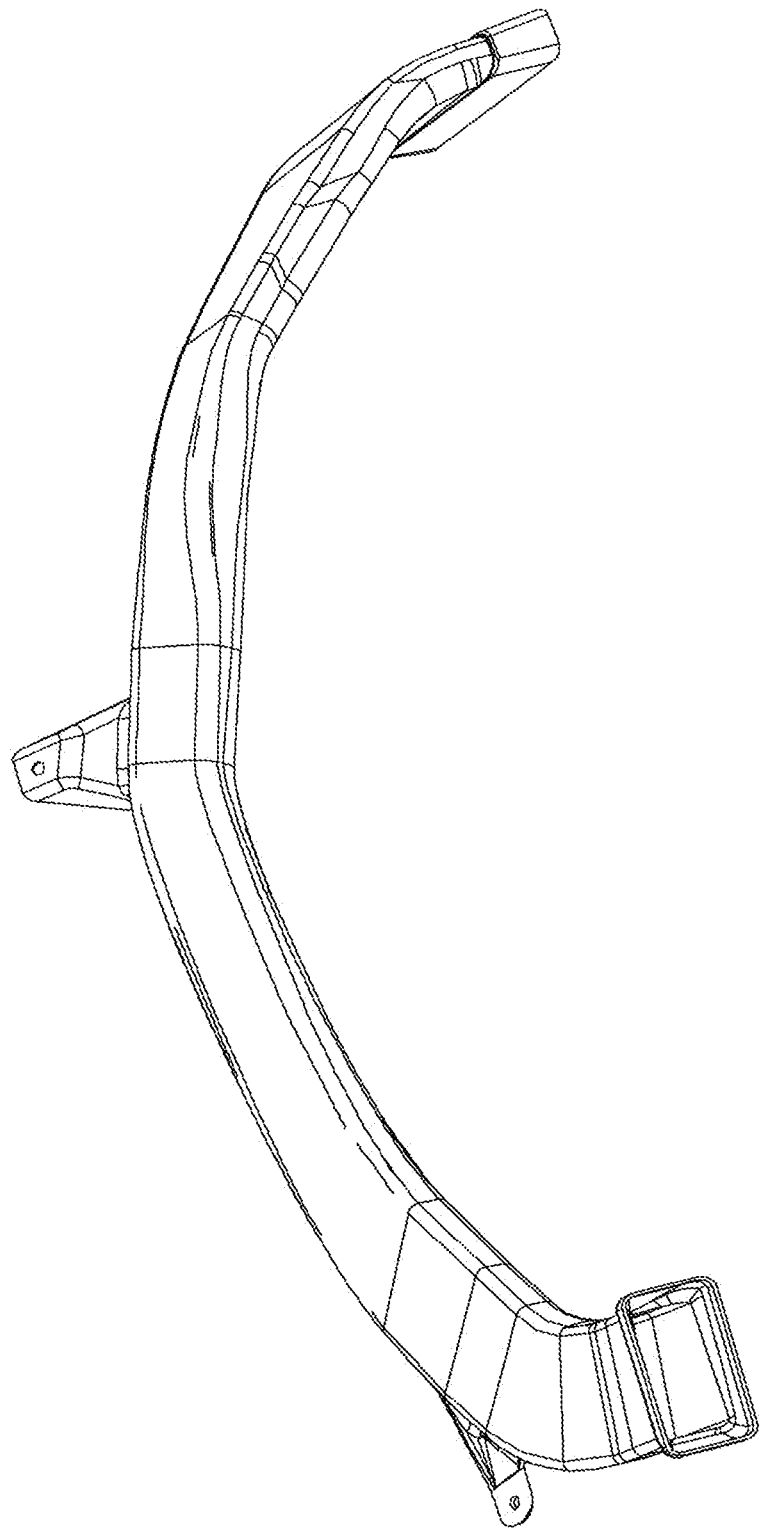
FIG. 9 is a drawing of the left hand demister duct formed from the present blow mold.
Figure 10:
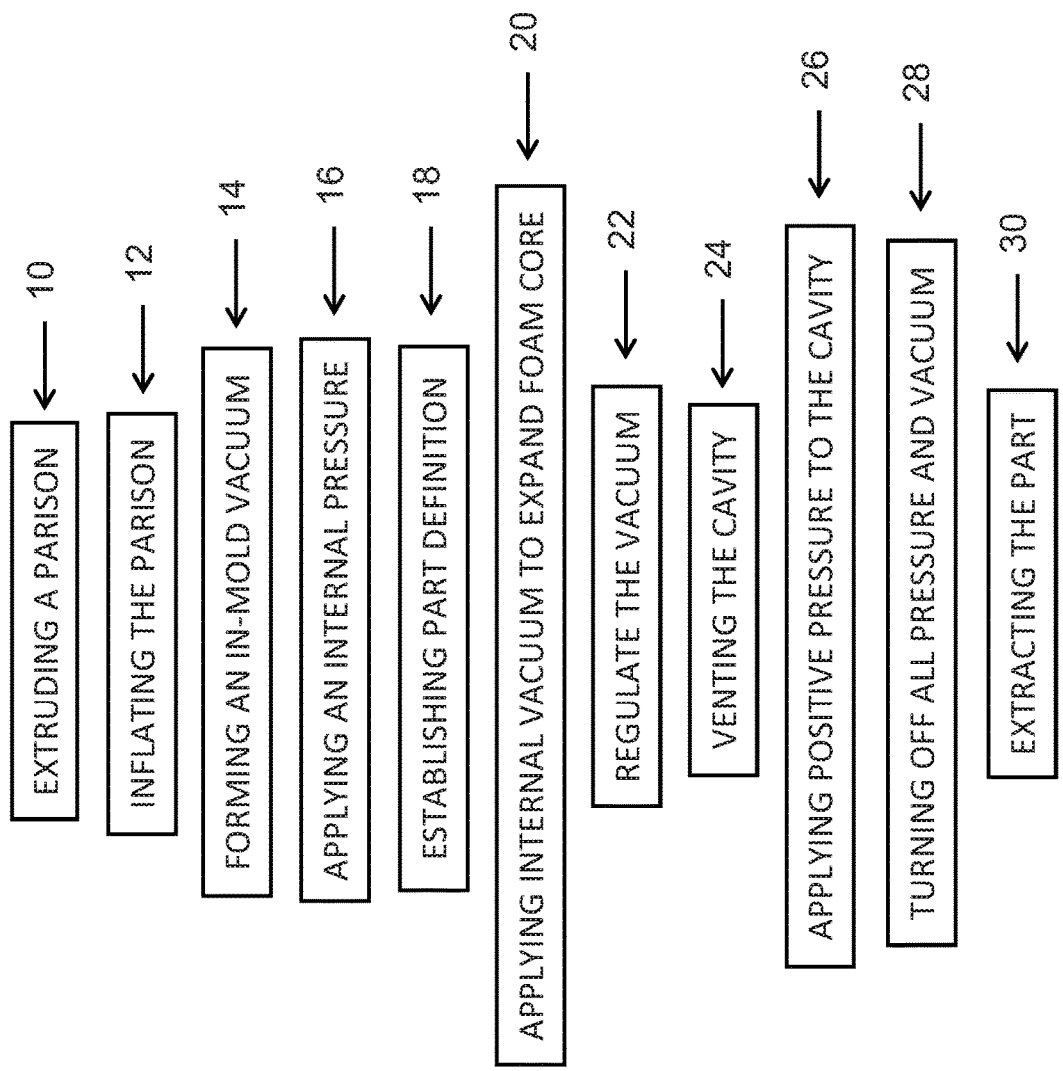
FIG. 10 is a flow schematic of the sub-ambient pressure process steps.
Figure 11B:
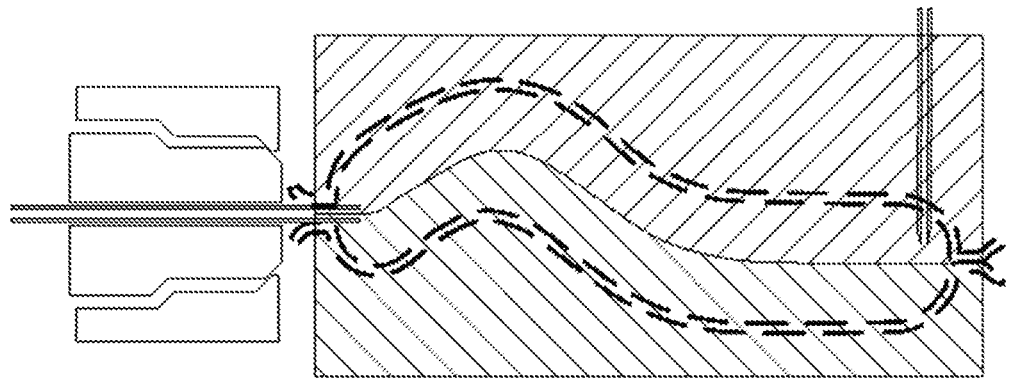
FIG. 11B is a pictorial of a parison formation.
Figure 11A:
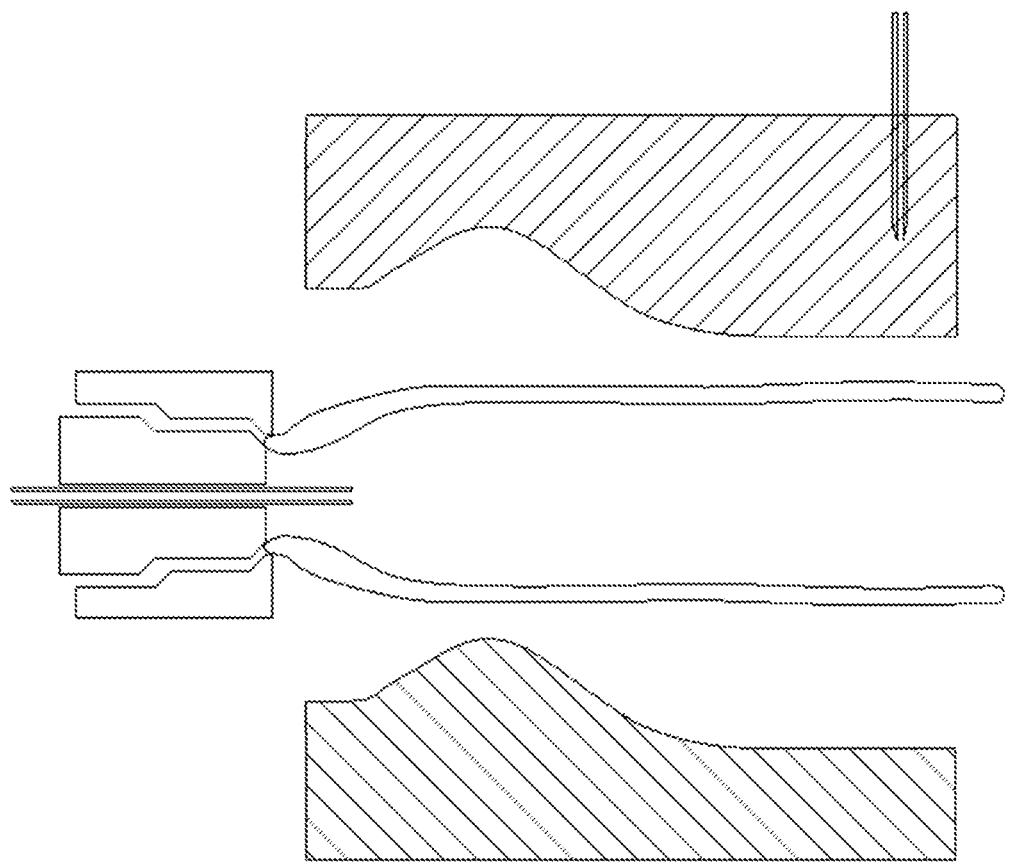
FIG. 11A is a pictorial of a parison formation.

FIG. 6 is a state chart of the process cycles and timing used to implement the simplest and most basic sub-ambient pressure process. Depicted is the pre-blow cycle, internal vacuum cycle, post blow cycle, mold vacuum cycle and blow pin pressure hold cycle;

FIG. 7 is a schematic of the simplest and most basic form of the sub-ambient pressure cycling apparatus employing the logic/timing chart of FIG. 7;

FIG. 8 is a drawing of the right hand demister duct formed from the present blow mold;

FIG. 9 is a drawing of the left hand demister duct formed from the present blow mold;

FIG. 10 is a flow schematic of the sub-ambient pressure process steps;

The sub-ambient pressure process comprises the following steps:

1. Extruding a parison (10) via the best procedure for the equipment used for the specific resin(s), foaming agent(s), gases, or pre-saturated resin pellets, and nucleating agent employed. This foamed parison should not be over-foamed, but simply foamed with only lightly expanded cells. Over-foaming will induce cell coalescence, collapse, and weak parison. Thicker parisons, related to die size, die gap, and extrusion rate, will offer improved control over skin thickness and core foam properties.

2. Use suitable pre-blow, both top and bottom, to gently inflate the parison and offer some degree of internal cooling to begin forming the internal skin, if desired.

3. As the mold begins to close, turn on both in-mold vacuum at vents and manage top and bottom pre-blow at low pressures and proper flow rates to gently draw the material tightly to the mold surface. The vacuum at the vents can be zoned or moderated to control parison movement, but should otherwise be as complete a vacuum as possible for maximum part definition and retention to the mold surface.

4. The mold closes completely at a programmed rate that works in conjunction with the vacuum draw through the mold vents and internally applied pressure (relative to the vacuum level maintained at the surface of the mold) to provide for optimal drawing in of the parison onto the mold.

5. After a pre-determined hold time under vent vacuum and pre-blow to establish part definition and inner and outer skins, vent the pressure from the interior of the formed parts.

6. A delay of 0.1 to several seconds can be employed after venting to allow outer skin to more fully form while not internally compressing foam cells.

7. Apply vacuum at a predefined level, as much as needed to expand the warm foam core, being careful to moderate the internal vacuum to prevent it from pulling the plastic article away from the mold surface. A 1-5" Hg differential of vacuum levels from inside to outside the part is suggested as sufficient to both expand the foam and prevent part collapse, but can be varied to adjust to varying resin properties or to a specific mold's tendency to release a part from the surface while forming. Under proper temperature and material property conditions, the timing, ramp-rate and magnitude of internal vacuum exposure can be effectively used to create an open-celled structure inside the core while the inner and outer surfaces remain with solid films or closed-cell structure. If desired, an open-cell structure can also be imposed on the innermost layer.

8. Hold vacuum inside the mold for a pre-determined period of time to achieve the desired foam expansion. 1-60 seconds appears to be effective for the current product, depending upon desired thickness. Within this stage, all gas cells in the still molten resin will begin to grow at a rate generally in proportion to the temperature of the resin where the cells are located. Even invisible, microscopic cells will grow and become evident; possibly to the extent that new cells can be nucleated from gas-rich regions of un-foamed resin. The extreme sub-ambient pressure, or vacuum, within the part can be maintained either statically or while flowing a suitable cooling medium, such as air, through the interior of the part if internal cooling at this stage is desirable.

9. Vent the cavity interior to ambient conditions to relieve the vacuum.

10. Apply positive pressure to the interior of the cavity to help establish solid contact with the mold wall for improved cooling until the part is sufficiently cooled to de-mold. This can also be maintained while flowing a suitable cooling medium, such as air, through the interior to speed cooling, but simply maintained at a higher absolute pressure than that used in step 8 above. If sufficient positive pressure is applied at the right time, while the foam in the core remains in a softened, yet un-molten state, the foam within the core can be cooled in a compressed state, which can result in foam cells with an auxetic structure.

11. Turn off both internal pressure and vacuum at the in-mold vents and vent to ambient conditions to relieve all pressure forces on the part.

12. Open the mold and extract the formed and foamed part.

Referring to FIG. 10, the sub-ambient pressure process is defined by the following steps:

extruding a piece of parison from a polymer material (10);

gently inflating the parison and offer some degree of internal cooling to begin forming an internal skin (12);

forming an in-mold vacuum and gently drawing the polymer material tightly to the mold surface (14);

applying an internally applied pressure relative to the vacuum level maintained at the surface of the mold (16);

maintaining said mold for a pre-determined hold time under vent vacuum and pre-blow to establish a part definition and inner and outer skins of desired thickness while venting the pressure from the interior of the formed parts (18);

applying a vacuum at a predefined level sufficient to expand a warm foam core (20);

regulating a vacuum inside the mold for a pre-determined period to achieve a desired foam expansion (22);

venting the cavity interior to relieve the vacuum (24);

applying positive pressure to the cavity interior (26);

turning off both positive pressure and in-mold vacuum (28);

extracting the formed and foamed part from the mold (30).

In another embodiment of the invention, maximum possible foaming without rapid mold heating or secondary addition of heat to the parison during foam expansion, with flow-through cooling of hollow part interior comprising the steps of:

a. Parison resins consisting of about 70-90% pre-foamed PE regrind, about 10-30% virgin PE, not including additives such as colorants, nucleating agents, chemical or physical blowing agents. Specific gravity of base resin blend is about 0.94-0.96. Alternatively parison resin composition has a specific gravity of about 0.89-0.91. Parison optimized for an automotive climate control duct, extruded at 380-420 F sufficient to produce a 1.5 mm thick foamed part.

b. Aluminum mold is configured for at least two blow pins, blow needles, or a combination. Mold is treated with a surface conductivity reducing coating, such as thermal barrier paint or hard-coat anodizing, in all areas where maximum foam expansion is desired. This will reduce heat loss from the parison to the mold before foam expansion can occur and to help balance internal and external cooling rates. Mold is maintained at 80 F. Mold cavity vent vacuum turned on prior to contact with parison. Vacuum set to maximum achievable setting or 29.5" Hg.

c. Parison is extruded from the die tip. Pinch bar closes on bottom of parison to close the parison. Pre-blow through top blow pin at 2-5 PSIG at a sufficient flow rate to properly pre-inflate parison prior to contact with mold. Mold halves move toward close.

d. Mold closes on parison. Hold pressure inside cavity for minimum possible time until parison makes full cavity contact, preferably less than 2 seconds.

e. Turn off blow pin pressure and apply vacuum to cavity through blow pin at maximum achievable vacuum level without pulling the parison off of the cavity walls, usually about 27.5" Hg. Hold vacuum until foam expands and begins to cool and stabilize, usually 10-15 seconds.

f. Pierce formed part with cylinder mounted blow needle or use second blow pin at a remote end of the part to begin flowing high volume/low pressure air through for internal cooling, maintaining at least 25" Hg vacuum inside part for until foam is completely solidified, around 15 seconds.

g. Switch top blow pin from vacuum to freely venting to ambient pressure. Increase blow needle flow rate and pressure sufficient to balance cooling rates between inside and outside the part to reduce warping and shrinkage. Hold for 20 seconds.

h. Turn off mold cavity vent vacuum and normalize pressures. Turn off secondary blow pin or needle airflow and normalize pressures.

i. Extract part from mold. Typical cycle time should be ~60 seconds for 1.5 mm thick foam, which will be expanded such that the density of the part walls are reduced by >50% from non-foamed wall sections.

j. Resulting cell structure is highly foamed with spherical or polyhedral cell shape with a slight gradient in foam expansion from lower on the mold side of the part wall, to higher foam expansion in the center, to slightly lower expansion on the inner surface of the wall. The skins on both inner and outer faces will be thin, yet continuous with exceptionally few to no expanded cells on the surface. The expansion ratio for the foam will typically be between 2× and 3.5× for such a part, depending on actual resin thickness and the ratio between skin and foam thicknesses in any particular location. As such, the specific gravity will generally fall between 0.48 and 0.27. With forced heating of the parison during foam expansion, or through the use of a highly efficient insulation on the mold surface to retain heat, it is projected that the expansion ratio in such areas will approach 4× with current chemical foaming agents; and perhaps more when using physical foaming methods. Higher foam expansion and resulting thickness will increase cycle times due to inefficient cooling as the foamed resin self-insulates and retains heat longer.

The parison can be optimized for either an automotive climate control duct or an under-hood air-intake duct extruded at about 380-410 F. The parison can be predominantly composed of polyamide or polyamide-polypropylene alloys, or predominantly of elastomeric thermoplastic resins such as TPOs, TPEs, or TPUs. The resulting structure yields closed cell outer skins each having approximately 10-30% of the wall thickness and an inner 30-80% of the wall thickness contains about 40-80% expanded cell network structure.

Figure 12:
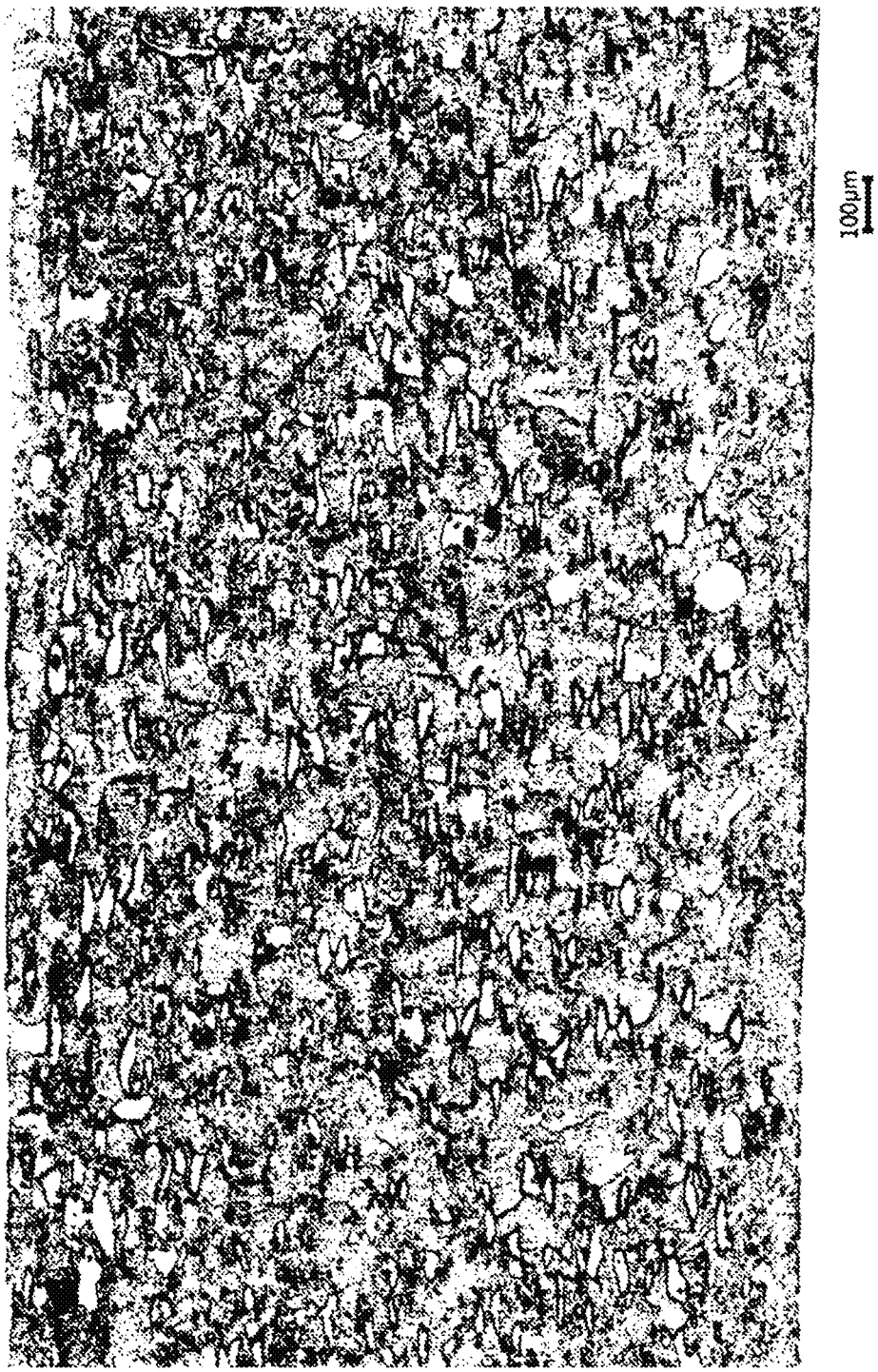
FIG. 12 is a picture of a cross section of cavity wall with a cryo-fractured sample showing sparse flattened cell structure for Example 1.
Figure 13:
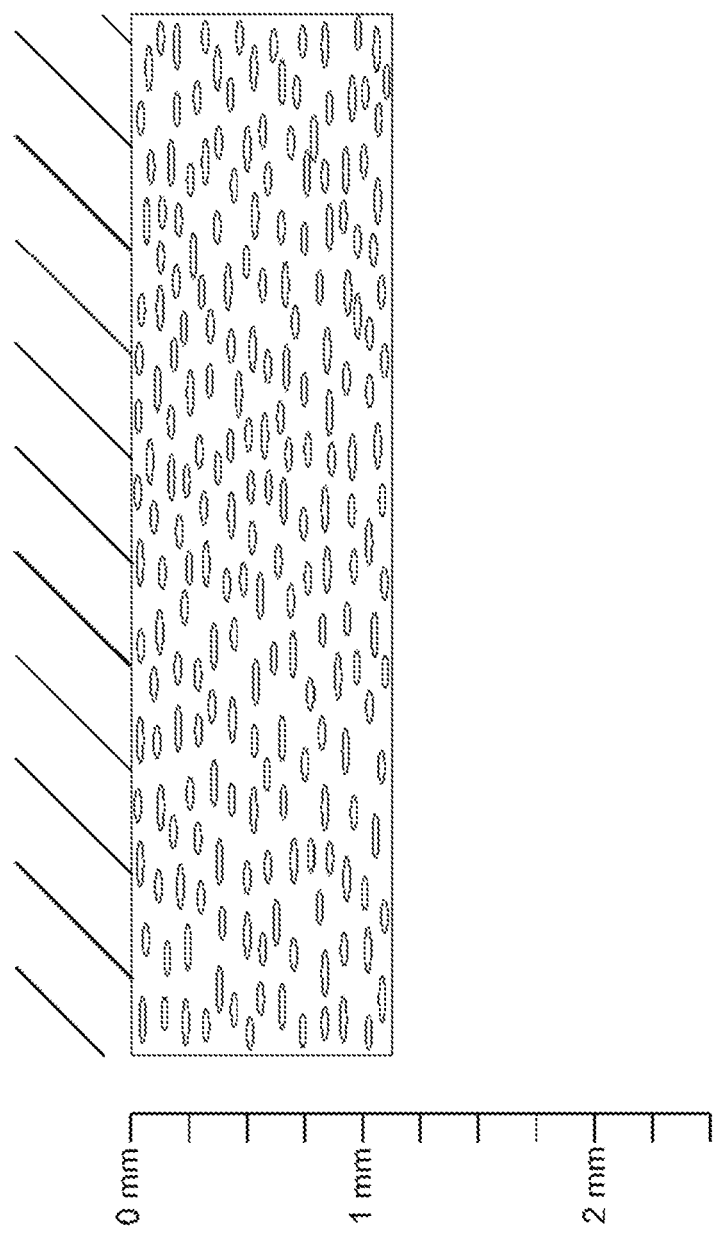
FIG. 13 is an illustration of a flattened cell structure for Example 1.

Example 1—Minimal Foam in Standard Foam Blow Molding—Low Pressure Pre-Blow Followed by 0.0 PSI Gage Blow Pressure. Referring to FIGS. 12 and 13 a. Parison consisting of blow mold grade pre-foamed 82.5% HMW HDPE regrind, 15% virgin HMW HDPE, with 0.5% carbon black color concentrate and 2% endothermic chemical foaming agent. Specific gravity of base resin blend is about 0.94-0.96.

b. Parison optimized for an automotive climate control duct, extruded at 380-420 F. Aluminum mold temperature is 80 F.

c. Mold cavity vent vacuum turned on prior to contact with parison. Vacuum set to ~29.5" Hg.

d. Pinch bar closes on bottom of parison to close the parison. Pre-blow through top blow pin at 2-5 PSI and 20 CFM to pre-inflate parison prior to contact with mold. Mold halves begin to move toward close.

e. Mold closes on parison. Internal pressure/flow through top blow pin turned off.

f. Turn off mold cavity vent vacuum and normalize pressures.

g. Hold part in mold until cool enough to de-mold. Turn off mold cavity vent vacuum and normalize pressures. Cycle time is approximately 68 seconds total.

h. Resulting cellular structure is sparse, with cells flattened and elongated along the plane perpendicular to the thickness direction to the wall.

i. The average specific gravity of the resulting material is 0.72, for an expansion ratio of ~P1.33.

Figure 14:
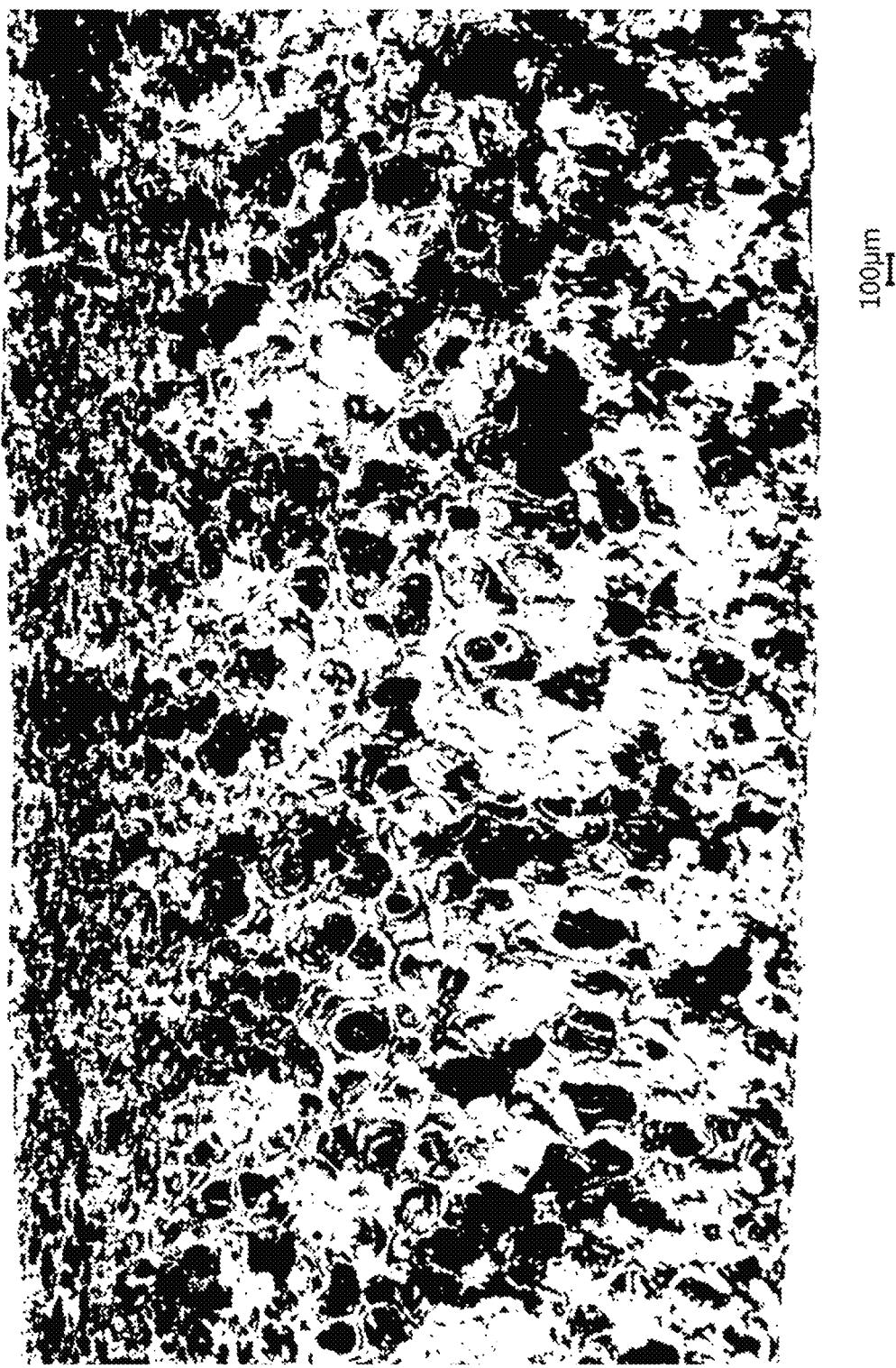
FIG. 14 is a picture of a cross section of cryo-fractured sample showing predominantly spherical or polyhedral cell structure for Example 2.
Figure 15:
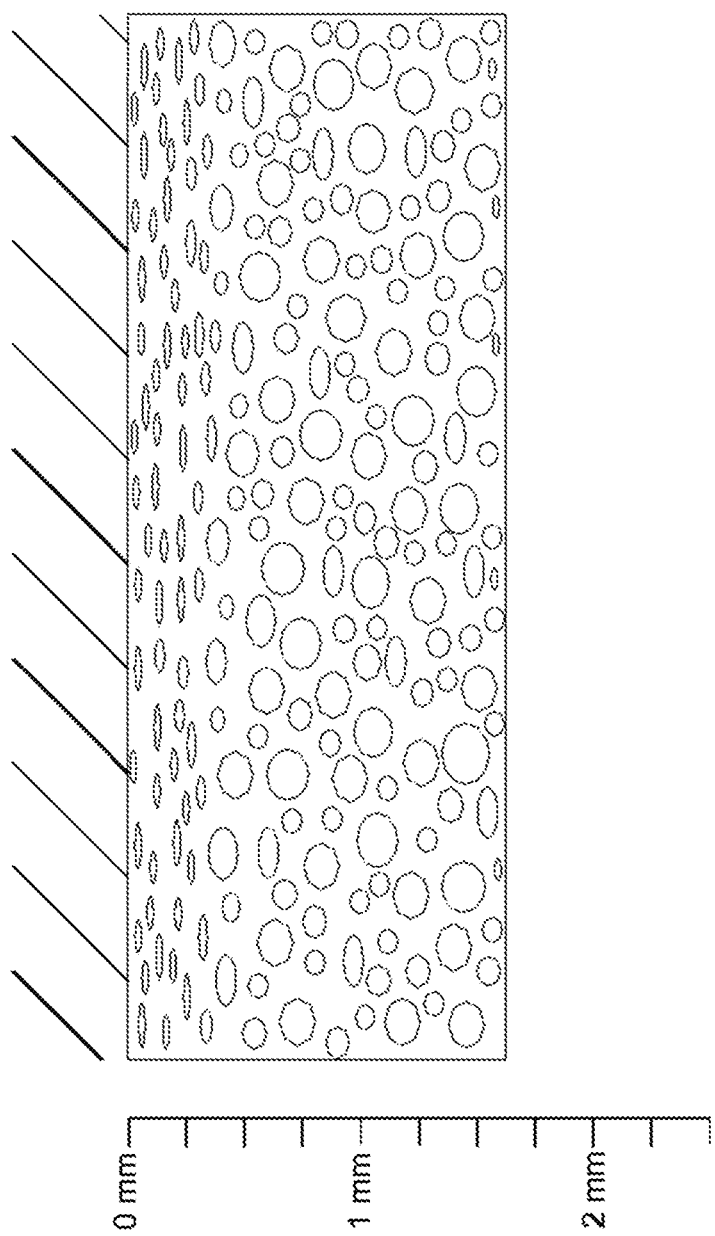
FIG. 15 is an illustration of a cavity wall with a predominantly spherical or polyhedral cell structure for Example 2.

Example 2—Highly Expanded Foam. Referring to FIGS. 14 and 15 a. Parison consisting of blow mold grade pre-foamed 82.5% HMW HDPE regrind, 15% virgin HMW HDPE, with 0.5% carbon black color concentrate and 2% endothermic chemical foaming agent. Specific gravity of base resin blend is about 0.94-0.96.

b. Parison optimized for an automotive climate control duct, extruded at 380-420 F. Aluminum mold temperature is 80 F.

c. Mold cavity vent vacuum turned on prior to contact with parison. Vacuum set to ~P29.5" Hg.

d. Pinch bar closes on bottom of parison to close the parison. Pre-blow through top blow pin at 2-5 PSI and 20 CFM to pre-inflate parison prior to contact with mold. Mold halves begin to move toward close.

e. Mold closes on parison. Internal pressure/flow through top blow pin turned off for 2 seconds.

f. Vacuum at a level of ~P20" Hg is applied through the top blow pin to the inside of the part for 30 seconds. Top blow pin vacuum is turned off and normalized.

g. Hold part in mold until cool enough to de-mold. Turn off mold cavity vent vacuum and normalize pressure. Cycle time is approximately 72 seconds.

h. Resulting cellular structure is densely foamed with cells generally spherical or polyhedral in nature, with a mild gradient to slightly flattened cells near the outer (mold-side) surface.

i. The average specific gravity of the resulting material is 0.45, for an expansion ratio of ~P2.13.

Figure 16:
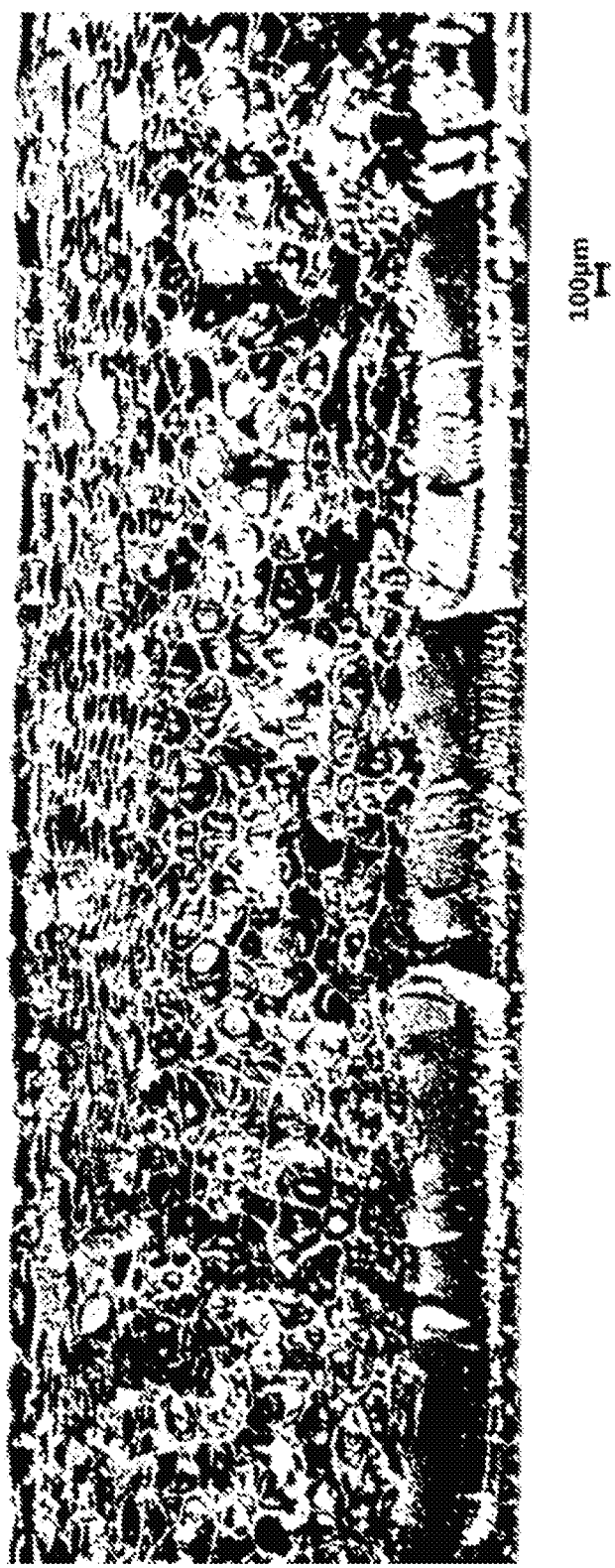
FIG. 16 is a picture of a cross section of cryo-fractured sample showing spherical cell structure in the center, but with a solid internal skin formed as a result of process timing for Example 3.
Figure 17:
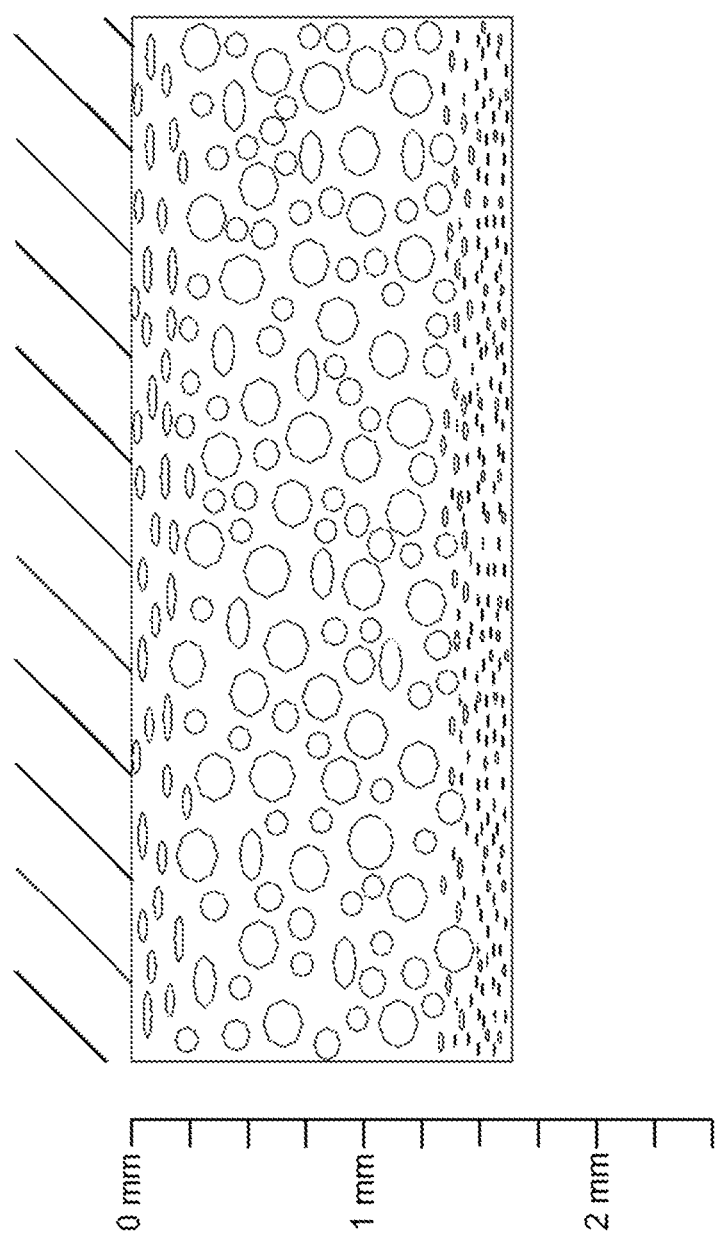
FIG. 17 is an illustration of a cavity wall with a spherical cell structure with a thick internal skin for Example 3.

Example 3—Structural Skin on Inside Surface Only. Referring to FIGS. 16 and 17 a. Parison consisting of blow mold grade pre-foamed 82.5% HMW HDPE regrind, 15% virgin HMW HDPE, with 0.5% carbon black color concentrate and 2% endothermic chemical foaming agent. Specific gravity of base resin blend is about 0.94-0.96.

b. Parison optimized for an automotive climate control duct, extruded at 380-420 F. Aluminum mold temperature is 80 F.

c. Mold cavity vent vacuum turned on prior to contact with parison. Vacuum set to ~P29.5" Hg.

d. Pinch bar closes on bottom of parison to close the parison. Pre-blow through top blow pin at 2-5 PSI and 20 CFM to pre-inflate parison prior to contact with mold. Mold halves begin to move toward close.

e. Mold closes on parison. Internal pressure/flow through top blow pin turned off for 2 seconds.

f. Vacuum at a level of ~20" Hg is applied through the top blow pin to the inside of the part for 20 seconds. Top blow pin vacuum is turned off and pressure of 30 PSI is applied while innermost layer of the parts inner wall is still molten.

g. Hold part in mold until cool enough to de-mold. Turn off mold cavity vent vacuum and blow pin pressure; normalize pressure. Cycle time is approximately 70 seconds.

h. Resulting cellular structure is densely foamed with cells generally spherical or polyhedral in nature, with a mild gradient to slightly flattened cells near the outer (mold-side) surface but with a thick skin on the inside surface of the part.

i. The average specific gravity of the resulting material is 0.57, for an expansion ratio of ~1.68.

Figure 18:
FIG. 18 is a picture of a cross section of a razor cut sample revealing dense, slightly foamed outer skins sandwiching a highly foamed, low density core for Example 4.
Figure 19:
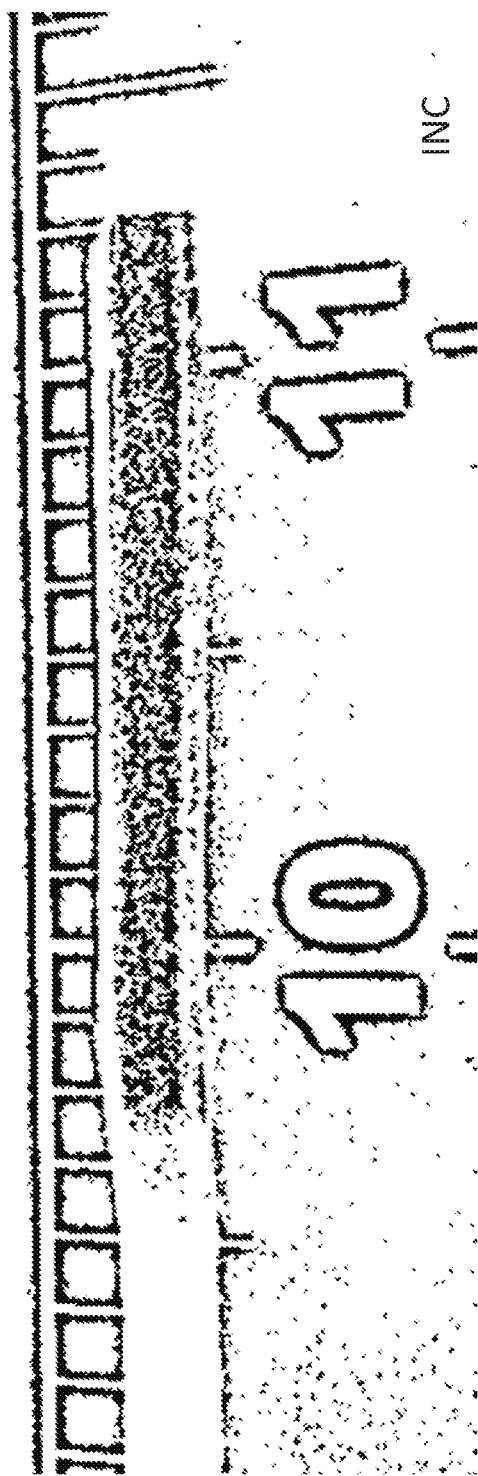
FIG. 19 is a picture of a cross section of a razor cut natural colored foam product with dyed cells to reveal a skin over foam sandwich structure. This sample has a specific gravity of 0.34, an expansion ratio of about 2.8 and is about 3.5 mm thick for Example 4.
Figure 20:
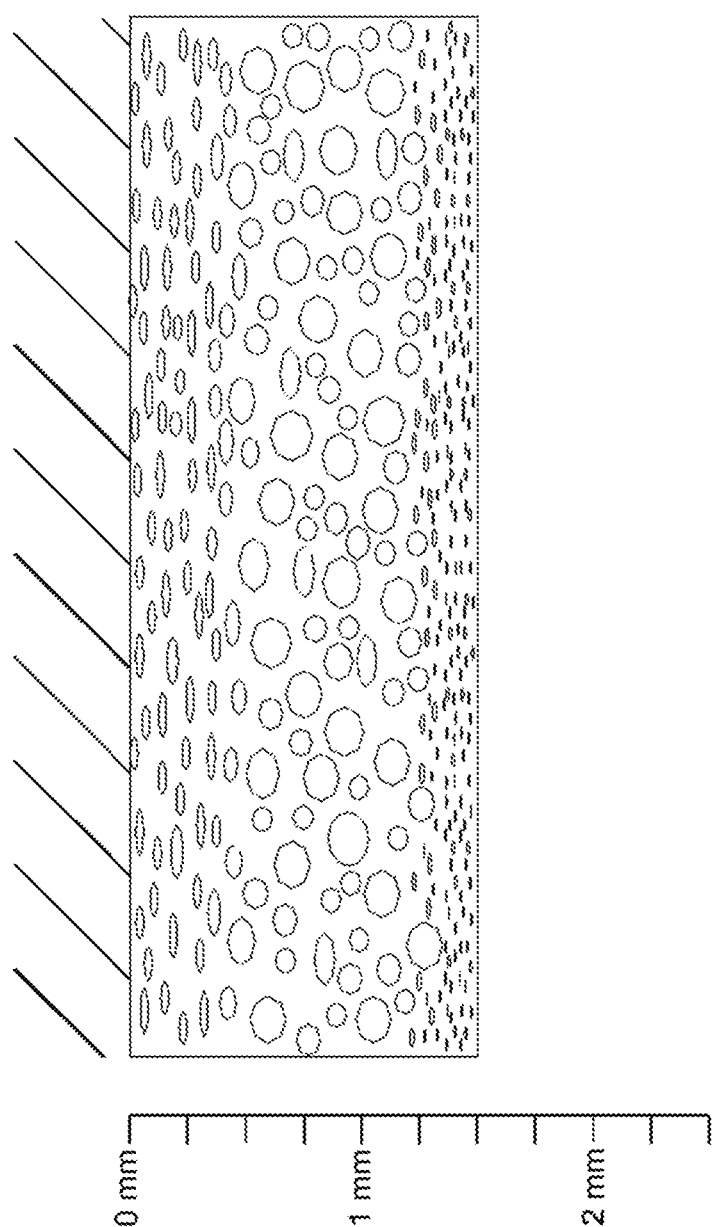
FIG. 20 is an illustration of a cavity wall with a thick outer skin and thick internal skin for Example 4.
Figure 21:
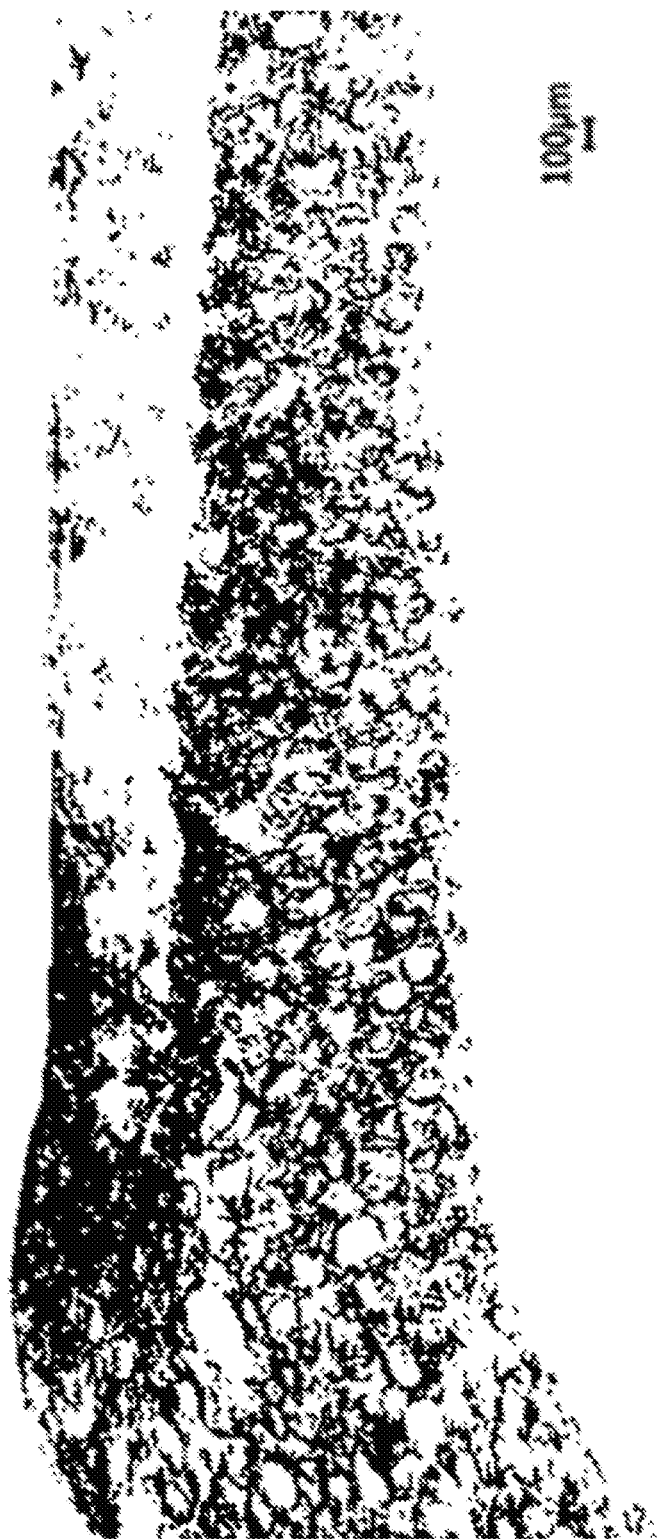
FIG. 21 is a picture of a cross section of a razor cut duct wall section revealing a transition from foamed interior wall, to that of a solid skin at the location where local heat was applied on the mold surface for Example 5.
Figure 22:
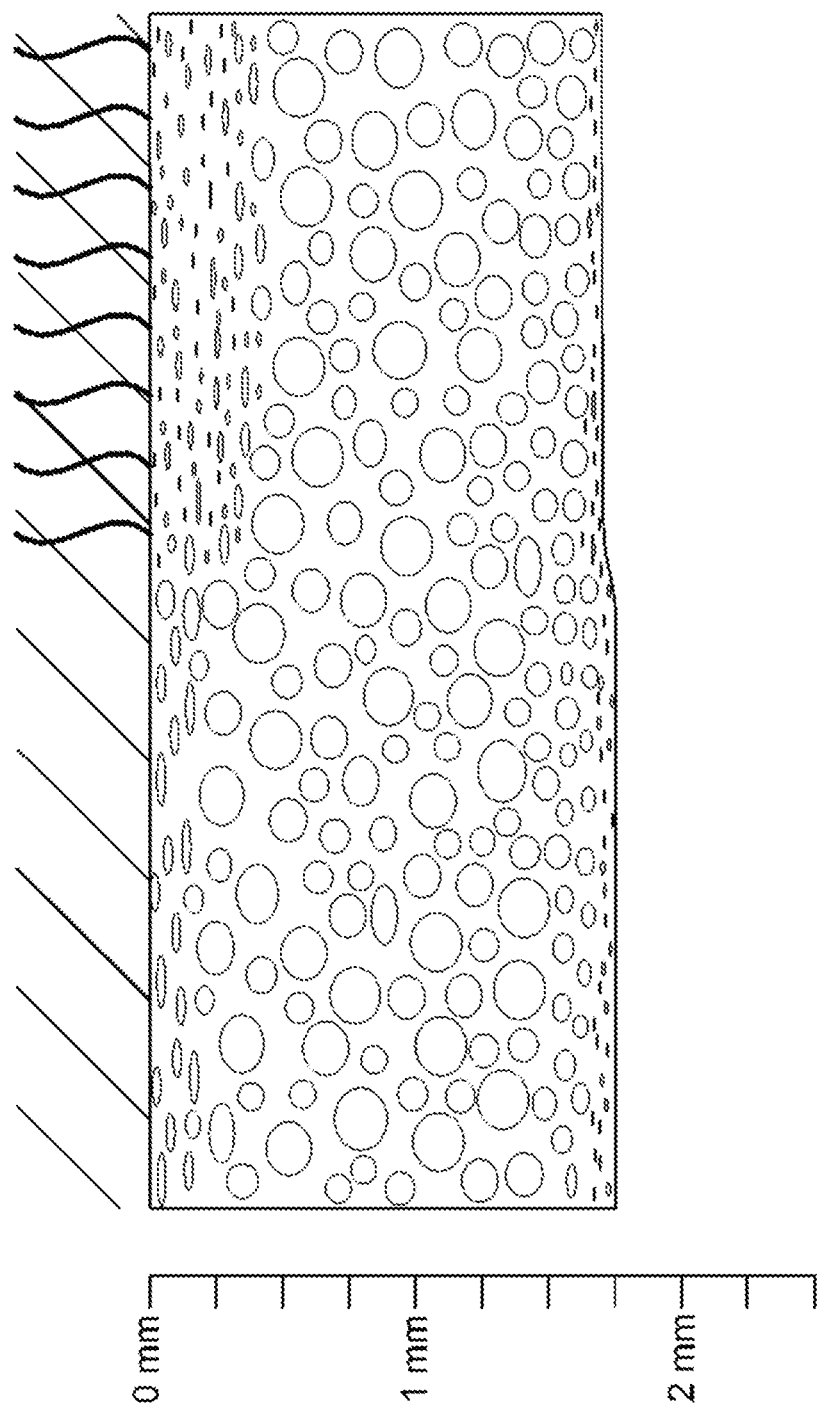
FIG. 22 is an illustration of a cavity wall with a stiff skin-over foam region for Example 5.
Figure 23:
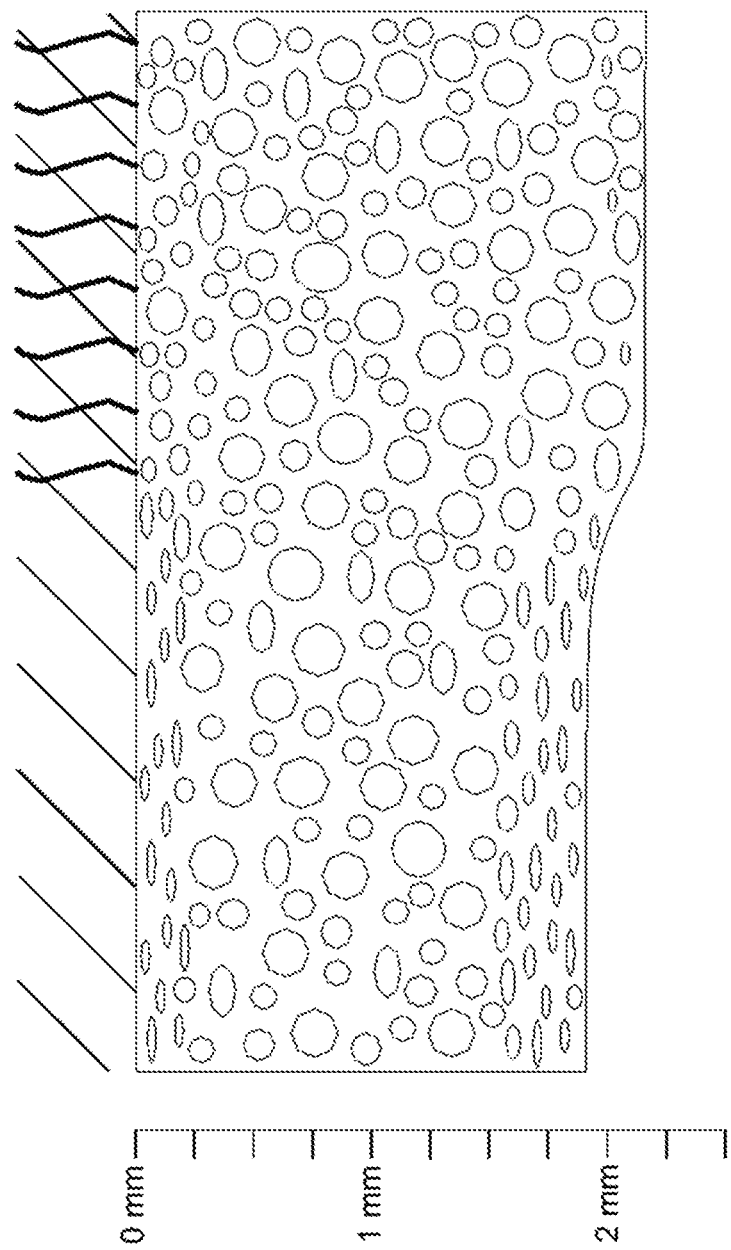
FIG. 23 is an illustration of a cavity wall with soft and compliant areas for Example 5.
Figure 24:
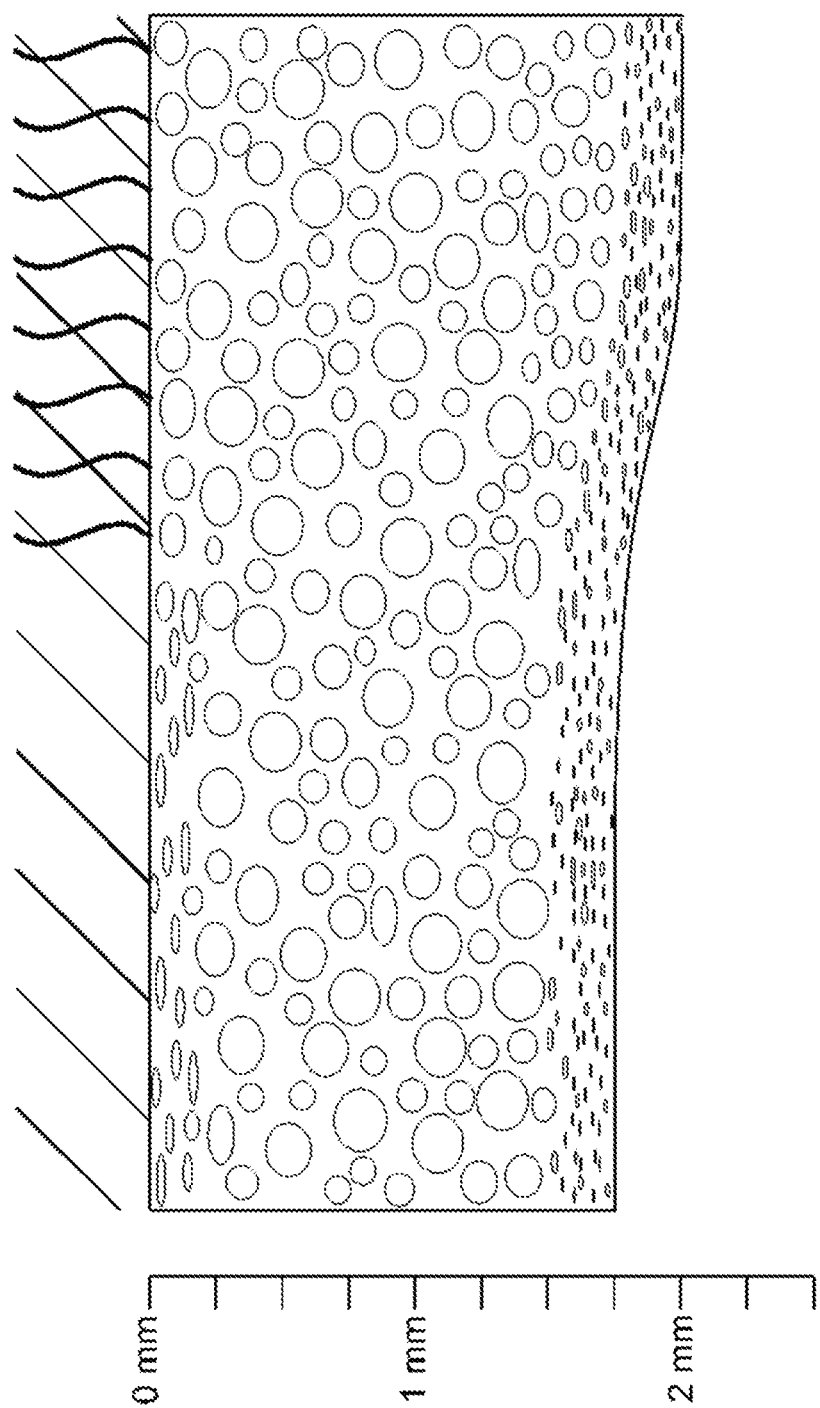
FIG. 24 is an illustration of a cavity wall with a local exterior area with fully expanded foam reinforced by a thick interior skin for Example 5.

Example 4—Skin Over Foam Structure. Referring to FIGS. 18-20 a. Parison consisting of blow mold grade pre-foamed 82.5% HMW HDPE regrind, 15% virgin HMW HDPE, with 0.5% carbon black color concentrate and 2% endothermic chemical foaming agent. Specific gravity of base resin blend is about 0.94-0.96.

b. Parison optimized for an automotive climate control duct, extruded at 380-420 F. Aluminum mold temperature is 80 F.

c. Mold cavity vent vacuum turned on prior to contact with parison. Vacuum set to ~29.5" Hg.

d. Pinch bar closes on bottom of parison to close the parison. Pre-blow through top blow pin at 2-5 PSI and 20 CFM to pre-inflate parison prior to contact with mold. Mold halves begin to move toward close.

e. Mold closes on parison. Internal pressure/flow through top blow pin turned off for 6 seconds.

f. Vacuum at a level of ~20" Hg is applied through the top blow pin to the inside of the part for 20 seconds. Top blow pin vacuum is turned off and pressure of 30 PSI is applied while innermost layer of the parts inner wall is still molten.

g. Hold part in mold until cool enough to de-mold. Turn off mold cavity vent vacuum and blow pin pressure; normalize pressure. Cycle time is approximately 72 seconds.

h. Resulting cellular structure is densely foamed with cells generally spherical or polyhedral in nature, with a mild gradient to slightly flattened cells near the outer (mold-side) surface.

i. The average specific gravity of the resulting material is 0.6, for an expansion ratio of ~1.6.

Example 5—Local Skin. Referring to FIGS. 21-24 a. Parison consisting of blow mold grade pre-foamed 82.5% HMW HDPE regrind, 15% virgin HMW HDPE, with 0.5% carbon black color concentrate and 2% endothermic chemical foaming agent. Specific gravity of base resin blend is about 0.94-0.96.

b. Parison optimized for an automotive climate control duct, extruded at 380-420 F. Aluminum mold temperature is 80 F.

c. An insulator or heat source is placed in a local area on the mold surface to preserve resin heat.

d. Mold cavity vent vacuum turned on prior to contact with parison. Vacuum set to ~29.5" Hg.

e. Pinch bar closes on bottom of parison to close the parison. Pre-blow through top blow pin at 2-5 PSI and 20 CFM to pre-inflate parison prior to contact with mold. Mold halves begin to move toward close.

f. Mold closes on parison. Internal pressure/flow through top blow pin turned off for 2 seconds. Local heat source is turned off, allowing cooling to begin.

g. Vacuum at a level of ~20" Hg is applied through the top blow pin to the inside of the part for 20 seconds. Top blow pin vacuum is turned off and normalized. Hold part in mold until cool enough to de-mold. Turn off mold cavity vent vacuum and normalize pressure. Cycle time is approximately 74 seconds.

h. Resulting cellular structure is reversed from typical outcomes, with highly expanded and generally spherical cells on the surface near the mold, instead of flattened, and near the center of the wall. A locally formed skin is formed on the internal surface, which offers a stiff reinforcement placed as needed in a part.

Figure 25:
FIG. 25 is a picture of a cross section of a cryo-fractured sample revealing the presence of an open-cell network structure in the center of the wall, surrounded by closed cell structures with skins both above and below the centerline for Example 6.
Figure 26:
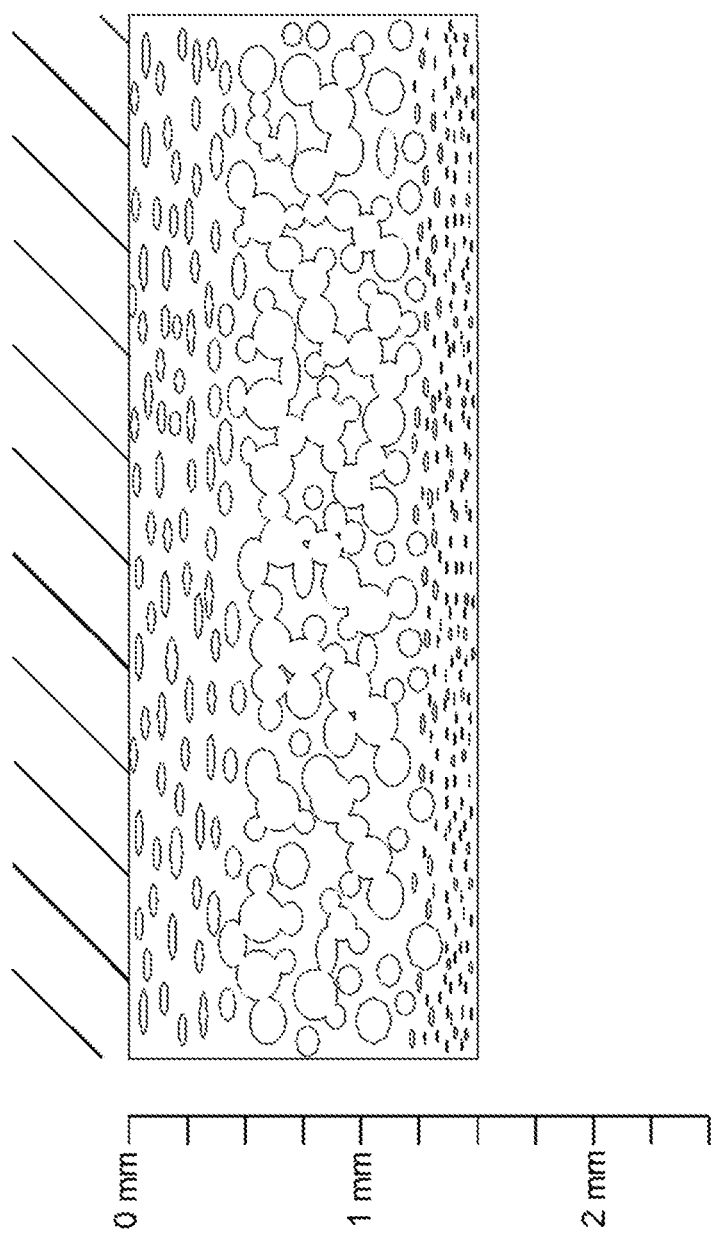
FIG. 26 is an illustration of a cavity wall with cells having auxetic properties for Example 6.
Figure 27:
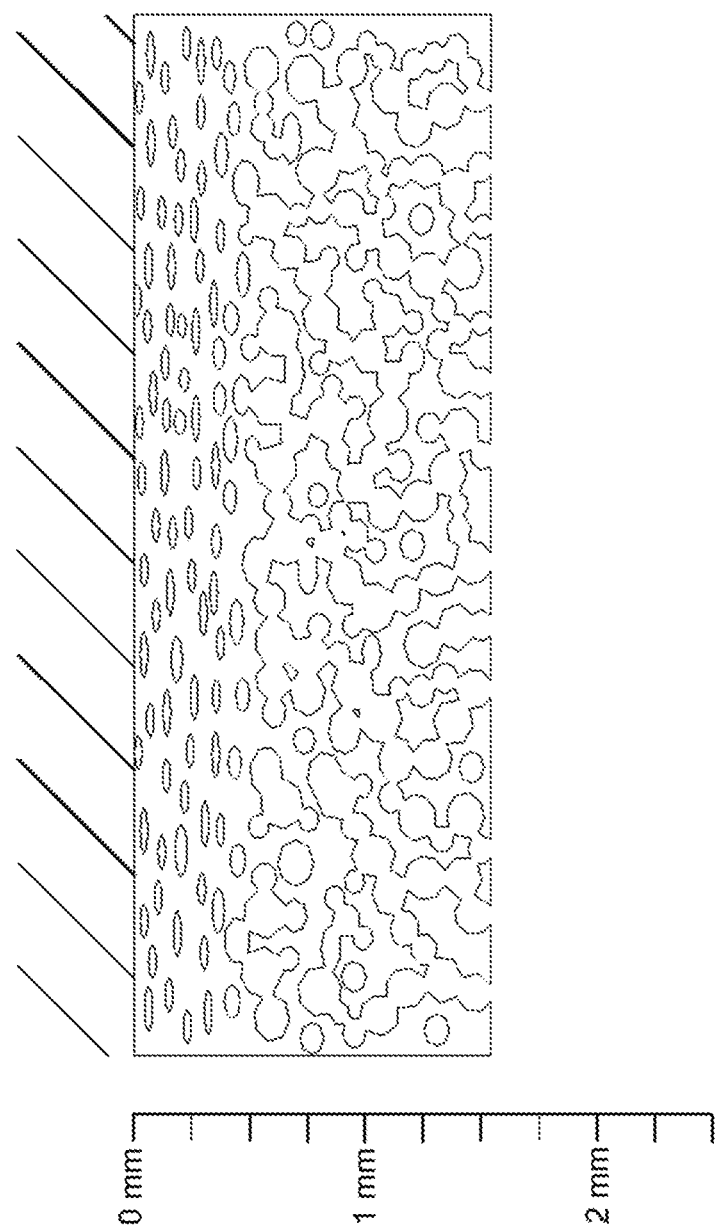
FIG. 27 is an illustration of a cavity wall with an open cell network comprising both the core and innermost layer of the total wall structure for Example 6.

Example 6—Open Cell Foam. Referring to FIGS. 25-27 a. Parison consisting of blow mold grade pre-foamed 82.5% HMW HDPE regrind, 15% virgin HMW HDPE, with 0.5% carbon black color concentrate and 2% endothermic chemical foaming agent. Specific gravity of base resin blend is 0.94-0.96. Lower melt strength materials are preferred for generating open cell foams.

b. Parison optimized for an automotive climate control duct, extruded at 380-420 F. Aluminum mold temperature is 80 F.

c. The top blow pin should be extended and blowing air at 2-5 PSI and <20 CFM during parison extrusion to begin chilling the very inner surface of the parison.

d. Mold cavity vent vacuum turned on prior to contact with parison. Vacuum set to ~29.5" Hg.

e. Pinch bar closes on bottom of parison to close the parison. Pre-blow through top blow pin at 2-5 PSI and 20 CFM to pre-inflate parison prior to contact with mold. Mold halves begin to move toward close.

f. Mold closes on parison. Low internal pressure of 5-20 PSI is maintained for 8-10 seconds to rapidly chill skin layers on inner and outer surfaces.

g. Vacuum at 27.5" Hg is applied through the top blow pin to the inside of the part for 10 seconds to rapidly expand the still warm inner layer sufficient to rupture many of the cell walls in the center layer; creating a network of open cell passages throughout the core of the sample. Hold until the core is in a barely molten state.

h. Top blow pin vacuum is turned and re-pressurized to 20-50 PSI to re-compress the open cell foam, creating a re-entrant, auxetic, structure to many of the cells in the core. Hold part in mold until cool enough to de-mold. Turn off mold cavity vent vacuum and normalize pressure. Cycle time is approximately 68 seconds.

i. The resulting structure yields closed cell outer skins, each of approximately 30% of the wall thickness. The inner 40% of the wall thickness contains a high proportion, 40-80%, open cell network structure. If the part was re-pressurized prior to core solidification, the volumetric compression of the core creates re-entrant cells of an auxetic nature. The open celled structure in the core, especially if made semi-auxetic, can effectively create a semi-coupled, double-walled structure that has acoustic and vibration transmission benefits. The specific gravity of such structures typically range from 0.6 to 0.4, for an effective expansion ratio of 1.6× to 2.5× when producing walls 1.5-2.0 mm thick.

Figure 28:
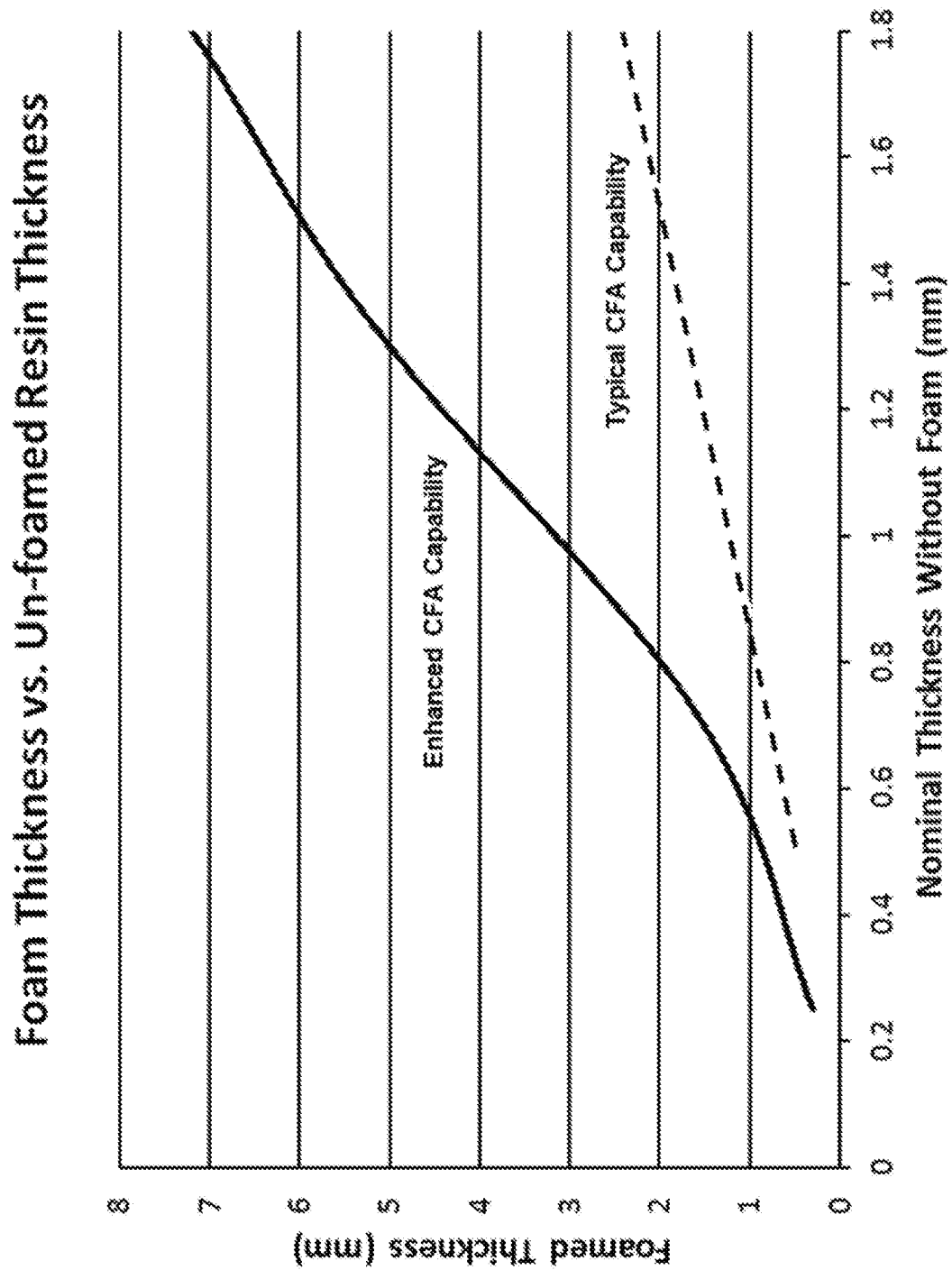
FIG. 28 is a graph presenting currently known or experimentally derived capabilities for foamed thickness vs. nominal thickness without foam using chemical foaming agents.

FIG. 28 is a curve that represents the current and experimentally derived foaming capability of the sub-ambient pressure blow molding technique with $CO_2$ bearing endothermic chemical foaming agents. The process is known to work similarly with physical foaming approaches, but the full capability range has not yet been developed.

In reference to the figures in general, a foam structure with a significantly open cell content, covered by closed cell foam and skin on an inner and outer layer is described for use as an automotive duct structure in accordance with the above described specification by the following steps: forming a blow mold in the shape of a selected duct structure; extruding a piece of parison from a polymer material; gently inflating the parison and offer a degree of internal cooling to begin forming an internal skin; forming an in-mold vacuum and gently drawing the polymer material tightly to a mold surface; applying an internally applied pressure relative to the vacuum level maintained at the surface of the mold; maintaining said mold for a pre-determined hold time under vent vacuum and pre-blow to establish a part definition and inner and outer skins of desired thickness; applying a vacuum at a predefined level to the cavity interior sufficient to expand a warm foam core; regulating a vacuum inside the cavity interior for a pre-determined period to achieve a desired foam expansion; venting the cavity interior to relieve the vacuum; applying positive pressure to the cavity interior; turning off both positive pressure and in-mold vent vacuum; and extracting the duct structure from the mold.

The duct has auxetic properties and is a foam structure with a significantly open celled foam core covered by closed cell foam and skins on the inner and outer layers. The duct is made of a polymer material selected from the group of: polyolefins, non-polyolefin polymers, or blends thereof.

The duct structure has a core and inner layer with significant expanded cells with an outer layer composed of closed cell foam and a skin. The expanded cells are generally spherical cells that are elongated normal to the material plane relative to their initial flattened state. Alternatively the expanded cells are generally polyhedral cells that are elongated normal to the material plane relative to their initial flattened state.

The expansion ratio of areas of the duct can vary up to about 200 percent or more. The foam structure has a density gradient variation of up to about 200 percent between adjoining layers of an inner third, a core third, and an outer third.

The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A duct structure formed from the steps of:
    forming a duct structure blow mold;
    extruding a piece of foamed parison from a polymer material;
    gently inflating said foamed parison and offer a degree of internal cooling to begin forming an internal skin;
    forming an in-mold vacuum and gently drawing said foamed parison material tightly to a mold surface;
    applying an internally applied pressure relative to a vacuum level maintained at the surface of said duct structure blow mold;
    maintaining said mold for a pre-determined hold time under vent vacuum and pre-blow to establish a part definition and inner and outer skins of a desired thickness;
    applying a vacuum at a predefined level to a cavity interior of said duct structure blow mold sufficient to expand a warm foam core;
    regulating a vacuum inside the cavity interior for a pre-determined period to achieve a desired foam expansion of said duct structure with significantly expanded generally spherical cells foam core covered by closed cell foam and skins on an inner and outer layer;
    venting the cavity interior to relieve the vacuum;
    applying positive pressure to the cavity interior;
    turning off both positive pressure and in-mold vent vacuum;
    extracting the duct structure from the mold.

2. The duct according to claim 1, wherein said duct has auxetic properties.

3. The duct according to claim 1, wherein said duct is a foam structure with a significantly open celled foam core covered by closed cell foam and skins on the inner and outer layers.

4. The duct according to claim 1 wherein said polymer material is selected from the group of: polyolefins, non-polyolefin polymers, or blends thereof.

5. The duct according to claim 1, wherein said generally spherical expanded cells are elongated normal to a material plane relative to their initial flattened state.

6. The duct according to claim 1, wherein said generally spherical expanded cells are generally polyhedral cells that are elongated normal to a material plane relative to their initial flattened state.

7. The duct according to claim 1, wherein expansion ratio of areas of the duct can vary up to about 200 percent or more.

8. The duct according to claim 1, wherein duct structure has a density gradient variation of up to about 200 percent between adjoining layers of an inner third, a core third, and an outer third.

9. The duct according to claim 1, wherein said foamed parison includes resins consisting of about 70-90% pre-foamed PE regrind, about 10-30% virgin PE, not including additives such as colorants, nucleating agents, or chemical or physical blowing agents.

10. The duct according to claim 9, wherein said foamed parison has a specific gravity of about 0.94-0.96.

11. The duct according to claim 1, wherein said foamed parison is optimized for an automotive climate control duct extruded at about 380°-420° F.

12. The duct according to claim 1, wherein said foamed parison includes resins consisting of about 70-92% pre-foamed PP regrind, about 8-30% virgin PP, not including additives such as colorants, nucleating agents, or chemical or physical blowing agent.

13. The duct according to claim 12 wherein said foamed parison has a specific gravity of about 0.89-0.91.

14. The duct according to claim 1, wherein said foamed parison is optimized for either an automotive climate control duct or an under-hood air-intake duct extruded at about 380°-420° F.

15. The duct according to claim 1, wherein foamed parison is predominantly composed of polyamide or polyamide-polypropylene alloys.

16. The duct according to claim 1, wherein said foamed parison is composed predominantly of elastomeric thermoplastic resins such as TPOs, TPEs, or TPUs.

17. The duct according to claim 1, wherein a resulting structure yields closed cell outer skins each having approximately 10-30% wall thickness and an inner 30-80% wall thickness contains about 40-80% expanded cell network structure.

* * * * *